(12) United States Patent
Harris et al.

(10) Patent No.: US 6,331,972 B1
(45) Date of Patent: Dec. 18, 2001

(54) PERSONAL DATA STORAGE AND TRANSACTION DEVICE SYSTEM AND METHOD

(75) Inventors: Jeffrey Martin Harris; Ernest Earl Woodward, both of Chandler; Ronald W. Borgstahl, Phoenix, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/794,312

(22) Filed: Feb. 3, 1997

(51) Int. Cl.[7] ...................................... H04Q 7/00
(52) U.S. Cl. .................. 370/313; 370/329; 370/338; 340/10.1
(58) Field of Search .................... 370/338, 313, 370/349, 310, 230, 276, 278, 329; 455/517, 66, 68, 69, 70, 435, 443; 364/708.1; 340/825.06, 825.54, 825.12, 10.1, 10.51, 10.52

(56) References Cited

U.S. PATENT DOCUMENTS

| | | | |
|---|---|---|---|
| 5,136,285 | * 8/1992 | Okuyama | 340/825.06 X |
| 5,221,838 | 6/1993 | Guman et al. | 235/379 |
| 5,276,680 | * 1/1994 | Messenger | 370/313 X |
| 5,371,738 | * 12/1994 | Moelard et al. | 370/338 X |
| 5,488,575 | * 1/1996 | Danielson et al. | 364/708.1 X |
| 5,537,459 | * 7/1996 | Price et al. | 455/435 |
| 5,561,446 | * 10/1996 | Montlick | 455/66 X |
| 5,655,219 | * 8/1997 | Jusa et al. | 455/435 X |
| 5,774,383 | * 6/1998 | Hankes | 364/708.1 |
| 5,790,536 | * 8/1998 | Mahany et al. | 370/338 |
| 5,844,893 | * 12/1998 | Gollnick et al. | 370/329 |
| 5,961,600 | * 10/1999 | Ono et al. | 709/228 |

OTHER PUBLICATIONS

The Salutation Consortium, "Salutation Architecture Specification (Part–1), Verson 2.0a," pp. 1–62, Dec. 2, 1996.*

* cited by examiner

*Primary Examiner*—Ricky Ngo
(74) *Attorney, Agent, or Firm*—Charles W. Bethards; Charles D. Watanabe

(57) ABSTRACT

A circuit and method for personalizing an electronic device (20) through a personal area network (22). Electron devices (20) have transceivers (38) for transmitting a self-initiated message that includes an identification code of the electronic device. Transceivers (38) are also capable of receiving a self-initiated message sent from other electronic devices. The received message causes a response message to be transmitted in response to the identification code in the self-initiated message. Communication between two electron devices (20' and 20") is established when the devices are determined to be compatible. The application of the electronic device is configured based on the response message and data is displayed by the electronic device based on the application.

18 Claims, 24 Drawing Sheets

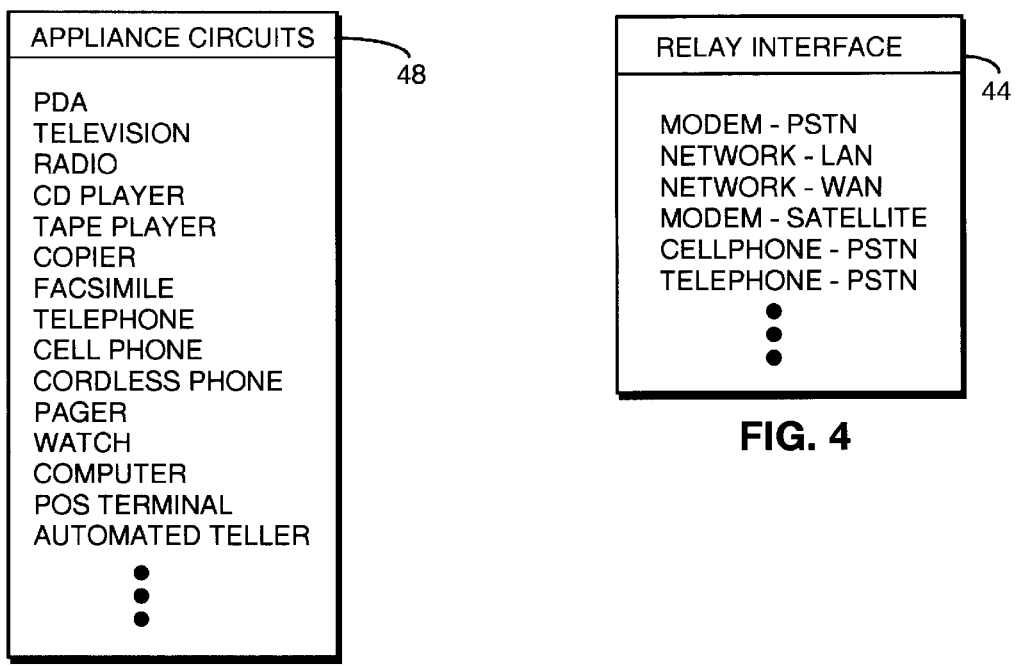
FIG. 3
FIG. 4
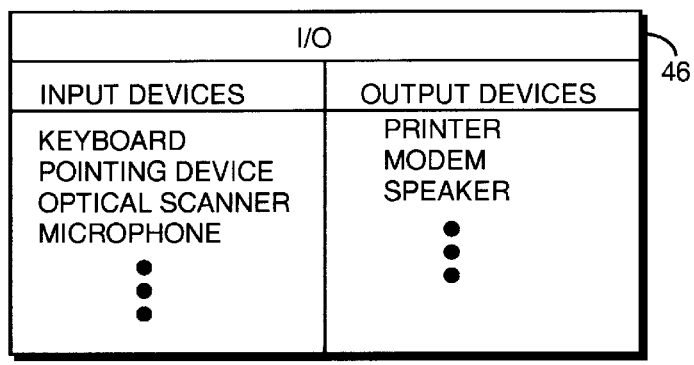
FIG. 5
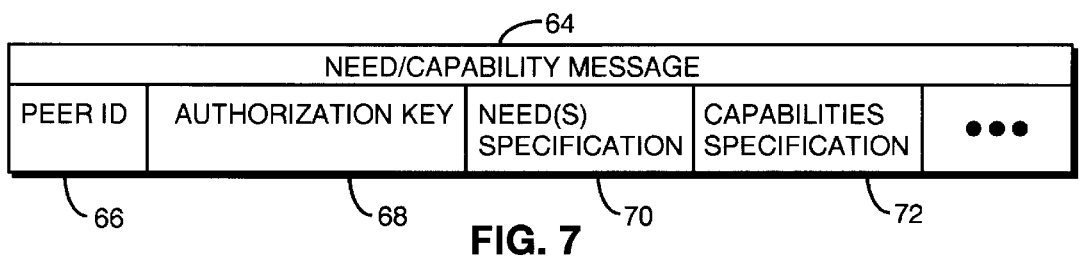
FIG. 7

| NEED TABLE | |
|---|---|
| CODE | MEANING |
| —— | APPLIANCE PERSONALIZATION (E.G., OWNER'S NAME) |
| —— | HARD COPY (E.G., PRINT) |
| —— | VISUAL IMAGE (E.G., DISPLAY) |
| —— | AUDIO (E.G., HIGH FIDELITY) |
| —— | GATEWAY (E.G., INTERNET) |
| —— | FINANCIAL TRANSACTION (E.G., POS, POINT OF SALE) |
| —— | LOCK/UNLOCK (E.G., SECURITY ENABLE/DISABLE) |
| ⋮ | ⋮ |

| CAPABILITY TABLE | |
|---|---|
| CODE | MEANING |
| —— | APPLIANCE PERSONALIZATION (E.G., OWNER'S NAME) |
| —— | HARD COPY (E.G., PRINT) |
| —— | MULTIMEDIA (E.G., REALTIME VIDEO) |
| —— | VOICE (E.G., SPEECH) |
| —— | AUDIO (E.G., HIGH FIDELITY) |
| —— | GATEWAY (E.G., INTERNET) |
| —— | FINANCIAL TRANSACTION (E.G., POS, POINT OF SALE) |
| —— | LOCK/UNLOCK (E.G., SECURITY ENABLE/DISABLE) |
| ⋮ | ⋮ |

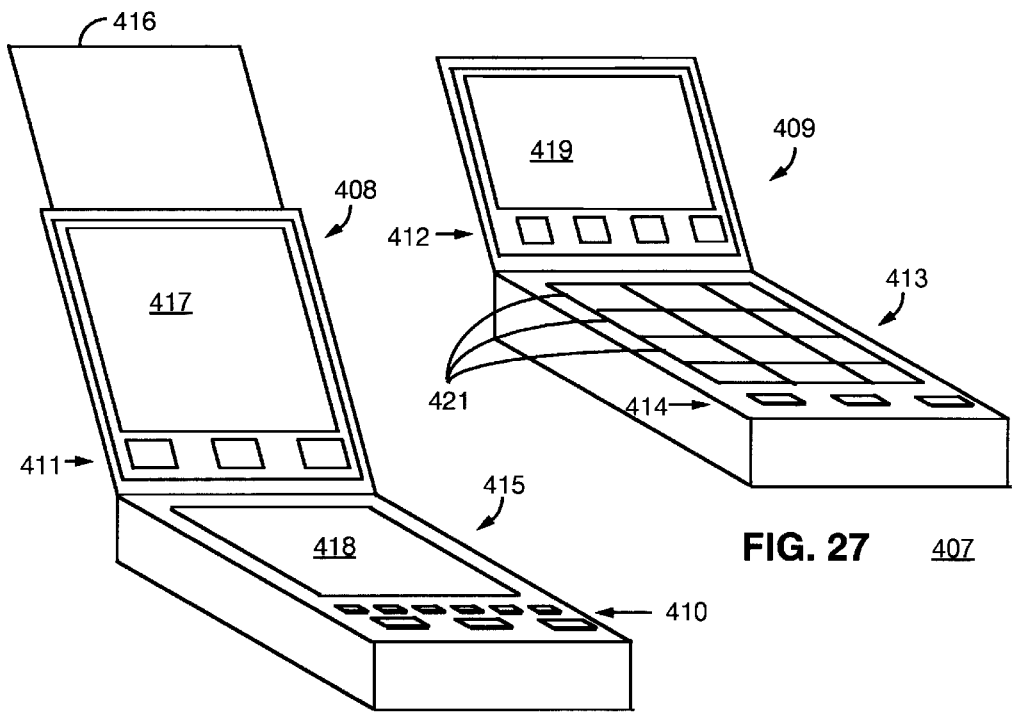
FIG. 26
FIG. 27
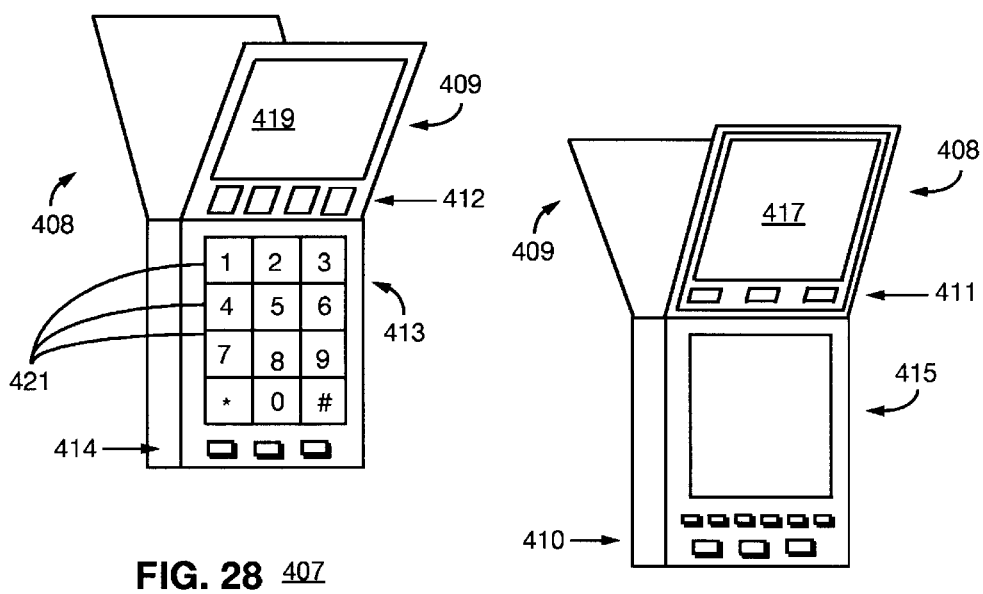
FIG. 28
FIG. 29

PERSONAL DATA STORAGE AND TRANSACTION DEVICE SYSTEM AND METHOD

CROSS-REFERENCE TO RELATED APPLICATIONS

This application is related to application Ser. No. 08/729,207, filed on Oct. 4, 1996, application Ser. No. 08/762,127, filed on Dec. 9, 1996; application Ser. No. 08/766,652, filed on Dec. 16, 1996 and application Ser. No. 08/774,977, filed on Dec. 26, 1996, which are assigned to the same assignee as the instant application.

TECHNICAL FIELD OF THE INVENTION

The present invention relates generally to data communication networks. More specifically, the present invention relates to a peer-to-peer network in which node addressing is dynamically configurable. Even more specifically, the present invention relates to an interactive personal data storage and transaction device.

BACKGROUND OF THE INVENTION

In a typical day many people come into contact with a massive number of electronically controlled devices. Such devices range from automobiles and appliances, to home and office equipment and to telephones and televisions to name but a few. Many of these devices are required to move from time to time. Many of these devices are even portable. These devices provide a vast and diverse assortment of services for the people coming into contact with them. However, they suffer from a common problem related to user input and output (I/O).

User I/O refers to components and processes used to communicate user-supplied data to an electronic device and to annunciate data from an electronic device so the data may be perceived by a user. Although electronic devices provide a vast and diverse assortment of services, they tend to have redundant I/O. In other words, many such devices have displays, speakers and the like at which data may be annunciated and have buttons, switches, keypads and other controls at which user-supplied data may be communicated to the devices. In order to keep costs low and size small, user I/O capabilities often suffer. As a result, many electronic devices encountered in everyday life and particularly many portable devices, are cumbersome and tedious to use because communicating data from a user to the devices is difficult and because provisions are unavailable for clearly annunciating data for a user's benefit.

In theory, this user I/O problem could be ameliorated by better integrating electronic devices to ease data communications therebetween. For example, a portable telephone could receive a facsimile (fax), but typically has no capability to print the fax and typically has no capability to communicate with a printer which may be able to print the fax. Likewise, a pager may receive a call-back phone number, but typical pagers have no capability to transfer the call-back number to a telephone from which the call-back can be made. User involvement is required to address these and many other data transfer issues. While many conventional data communication or computer network architectures are known, the conventional architectures are unsuitable for the task of integrating a plurality of electronic devices which collectively provide a vast and diverse assortment of services.

Conventional computer networks require excessively complicated setup or activation procedures. Such setup and activation procedures make the jobs of forming a connection to a new network node and making changes in connectibility permission cumbersome at best. Setup and activation procedures are instituted, at least in part, to maintain control of security and to define network addresses. Typically, a system administration level of security clearance is required before access is granted to network tables that define the network addresses. Thus, in conventional networks, many network users lack sufficient security clearance to activate and obtain addresses of network nodes with which they may wish to connect on their own.

Once setup is performed, either directly by a user or by a system administrator, connections are formed when an initiating node presents the network with the address of a network node to which a connection is desired. The setup or activation requirements of conventional networks force nodes to know or obtain a priori knowledge of node addresses with which they wish to connect prior to making the connection. Excessive user attention is involved in making the connection through setup procedures and during the instant of connection to obtain addresses. This level of user involvement leads to an impractical network implementation between the everyday electronic devices with which people come into contact.

Further, conventional computer networks tend to be infrastructure intensive. The infrastructure includes wiring, servers, base stations, hubs and other devices which are dedicated to network use but have no substantial non-network use to the computers they interconnect. The use of extensive network components is undesirable for a network implementation between everyday electronic devices because an immense expense would be involved to support such an infrastructure and because it impedes portability and movability of nodes.

The use of wiring to interconnect network nodes is a particularly offensive impediment to the use of conventional networks because wiring between diverse nodes is not suitable when some of the nodes are portable. Wireless communication links could theoretically solve the wiring problem, and conventional wireless data communication networks are known. However, the conventional wireless networks do little more than replace wire lines with wireless communication links. An excessive amount of infrastructure and excessive user involvement in setup procedures are still required.

There is a lot of information that one typically carries with their person. These data are encoded onto physical artifacts that are then tucked inside a wallet or a purse or simply carried in a pocket. In order for the artifact to be useful one must physically carry it around anticipating its use. Eventually, the wallet or purse gets bulky while carrying everything that you might anticipate using over the course of a week or a month. When an artifact is being used it must be physically removed from the wallet, and then returned upon completion of the transaction, if appropriate. The process of repeatedly removing and then replacing an artifact from the wallet both causes wear on the artifact and also subjects it to loss and theft. By digitizing all three categories of artifacts and by being able to selectively move the artifacts over a wireless link these problems are solved.

Individuals routinely carry three categories of things in their wallet:

1) financial instruments that can be used to obtain goods or services,
2) items used as physical or logical "pass keys", and
3) lists of data.

The first category, "financial instruments", usually includes paper cash and coins, credit cards, debit cards, cash cards, gift certificates, and discount coupons.

The second category contains artifacts that give you physical or logical access to some privilege. Cards containing personal information such as a social security number, health insurance number, and car insurance identification are often found in an individual's wallet for this purpose. Such contents may also include video club memberships, frequent eater cards such as those given out by restaurants, frequent flyer cards associated with the airline industry, warehouse store membership cards, telephone company calling cards, public library cards, and so on. Legal identification such as a drivers license or passport also fall into this category. Tickets such as those purchased for the theatre, football game or lottery reside in this category. This category may also harbor physical pass keys such as a door key or magnetic pass keys encoded onto a credit card format like those given out by a hotel.

The third category of artifact that people typically carry with them in a wallet are simply lists of data. Such lists may include medical emergency information such as medications, blood type, previous surgeries, name of doctor, next of kin, and so on. Telephone numbers, shopping lists, maps, your spouse's clothing sizes and color preferences, your children's birthdays, and calendar & schedule information are also included in this category. Pictures of your family can be treated as belonging to this category. Purchase receipts and other records of transactions fall into this category.

Note that these three categories of data are not necessarily mutually exclusive. Take for example the number on one's telephone calling card. This could easily fall into all three categories. First, it is a financial instrument because it allows access to toll services. Second, it is a logical pass key to a telephone's toll services. And third, it is a data item because ultimately it is just a number. This example implies that the data that an individual carries with them needs to be structured, in other words, meta-data are needed in order to enhance the information's use.

Current devices have yet another problem with respect to a subclass of the third type of data, "lists of data". Quite often there exists data purely about an individual that the individual cannot have access to; in some cases the individual can read the data but cannot change it, and in other cases the individual cannot even read the data. Two examples of this sort of data are credit histories and medical histories. In both cases the data refers to a specific individual, yet that individual cannot have write access to that data. This is for good reason, because while the data is about the individual, the individual is not the caretaker of that data. This type of data is called "restricted data" in the following discussions. Currently, if an individual wants to share such data with a third party, e.g., they are establishing a new physician or they are applying for a loan, they must refer the third party back to the caretaker of the data. Several personal transaction scenarios require a mechanism that allows the individual to carry such information with them and share it without the need for a caretaker.

Currently, the closest technology that accommodates the previously discussed needs is a SmartCard. A SmartCard is a credit-card sized database that is able to store and exchange information. Yet, the SmartCard is inadequate in the following ways: 1) A SmartCard has no user interface. Typically, the SmartCard is inserted into another device that allows the user to enter and retrieve data from the database. 2) A SmartCard must be physically docked with another device to transfer information. This is because the Smart-Card has no user interface of its own, and it has no other communication link. 3) SmartCards tend to store a very narrow range of information. For example, a SmartCard would hold money, or at least its electronic equivalent. If one wanted to store pictures it would require another SmartCard. This is primarily because of the method used to access the information. The range of data on a SmartCard is narrow also because the SmartCard provides no mechanisms for structuring the data. 4) The user of a SmartCard must take overt action to use the capabilities of the SmartCard. At a minimum, they must pull it out of their wallet and run it through a reader. On the contrary, the user needs a device that can be configured to automatically (with no overt action from the user once programmed in this manner) perform transactions in specific situations. 5) When used for identification purposes, a specific SmartCard carrying legal identification must be physically read. This identification is performed only when the user takes the overt action to do so. What is needed is a device capable of beaconing a wireless digital identification at periodic intervals or when overtly "pinged" or interrogated by another unit. In this way the user can be identified with no overt action.

Another device which attempts to address some of the previously discussed needs and issues is a Personal Digital Assistant, otherwise known as a PDA. Advantages and disadvantages of the PDA include: 1) The PDA has some sort of user input capability and some user output capability directly on the unit. 2) The PDA can store fairly large amounts of unstructured data. 3) There is still a need to structure data beyond what the typical PDA allows. The typical PDA only allows business cards, notes and scheduling information. 4) The typical PDA uses some sort of physical coupling, perhaps through a docking station, to transfer information from one unit to another. In addition to a physical coupling capability, some PDAs also employ an IRDA wireless link for this purpose. 5) Current PDAs do not support "restricted data".

What is needed is a device/method for overcoming these deficiencies of the prior art, in a hand-holdable and readily reconfigurable fashion.

BRIEF DESCRIPTION OF THE DRAWINGS

A more complete understanding of the present invention may be derived by referring to the detailed description and claims when considered in connection with the Figures, wherein like reference numbers refer to similar items throughout the Figures and:

FIG. 3 shows a list of appliance circuits which may be included in the hardware illustrated in FIG. 2;

FIG. 4 shows a list of gateways which may be included in the hardware illustrated in FIG. 2;

FIG. 5 shows a list of I/O devices which may be included in the hardware illustrated in FIG. 2;

FIG. 7 is a data format diagram of an exemplary need/capability message communicated from a peer to initiate a setup connection;

FIG. 8 shows an exemplary need table which identifies possible network service needs which might occur at a peer;

FIG. 9 shows an exemplary capability table which identifies possible network capabilities which may be provided by a peer;

FIGS. 26–29 are a series of sketches of views of a portable, hand-holdable digital device for storing data and effecting transactions;

DETAILED DESCRIPTION OF THE DRAWINGS

Figure 1:
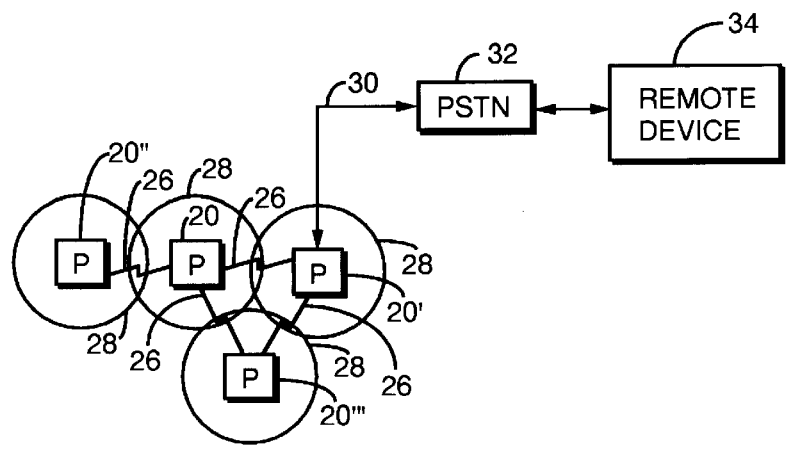
FIG. 1 is a layout diagram depicting exemplary relationships between various peers in a wireless peer-to-peer data communication network configured in accordance with the teaching of the present invention.

FIG. 1 is a layout diagram depicting relationships between various peers (P) 20 in capability addressable, wireless, peer-to-peer data communication network 22 configured in accordance with the teaching of the present invention. While FIG. 1 shows only few peers 20, virtually any computer or microprocessor controlled electronic device throughout the world may serve as a peer 20. Accordingly, network 22 supports an unlimited number of possible connections between peers 20.

As used herein, the term "peer-to-peer" is defined to mean having at least common portions of communications protocol and/or capability and does not refer to equivalence of physical size, functional capability, data processing capacity or transmitter/receiver range or power. Each peer or communication node 20 of communications network 22 may establish a personal area network. For example, a first and a second of nodes 20 first find or determine that each other is a compatible node. Then, as a result of self-initiated processes, first and second nodes 20 form the personal area network. First and second nodes 20 must detect that they are in a particular proximity to one another and if so a communication link is established. This link may be accomplished by known RF, IR, optical or acoustic techniques or by conduction through a living body. When a link is established, first and second nodes 20 exchange what their needs and capabilities are. When needs and capabilities are not able to be satisfied or matched, one of first and second nodes 20 may alternately route the communications link to a third communication node 20. Put another way, a communications platform that includes at least two nodes having overlapping communications regions could also include means for exchanging needs and capabilities information between the at least two nodes for forming a communication network.

Network 22 is desirably configured in a peer-to-peer architecture so that only a minimal number of network-specific components are used and no fixed infrastructure is required. In the preferred embodiments, each peer 20 can initiate a connection with other peers 20 without servers being required to manage the connections. Moreover, peers 20 can freely move about without affecting the network structure or requiring the performance of reconfiguration, setup or activation procedures.

Free movement of peers 20 is further supported by using wireless communication links 26 as a physical transport layer in network 22. In the preferred embodiments, wireless communication links 26 are RF links operating in the higher regions of the microwave band so that small, lightweight, inexpensive, omni-directional antennas may be used. However, other RF frequencies, optical links and other wireless communication links known to those skilled in the art may be used as well. The specific protocols used in implementing wireless communication links 26 are not important to the present invention. Various TDMA, FDMA and/or CDMA techniques known to those skilled in the art may be employed. However, all peers 20 in network 22 desirably have the ability to communicate using the protocols, regardless of the capabilities and needs of the peers 20.

FIG. 1 depicts detection zone 28 surrounding each peer 20. In the preferred embodiments, wireless communication links 26 for the vast majority of peers 20 are operated at a sufficiently low power so that a wireless communication range for a given peer 20 is preferably less than 5 meters, although the range may be much greater, for the typical peer 20. The use of this degree of low power transmissions limits interference between independent connections which may share the wireless spectrum at different locations. Moreover, the use of this degree of low power transmissions is compatible with configuring a substantial portion of peers 20 as portable devices. Those skilled in the art will appreciate that hand-portable electronic devices share the characteristics of being physically small, lightweight and including a self-contained power source, such as a battery. Extremely low power transmissions do not severely deplete the reserves of small batteries typically used in portable devices.

While peers 20 may potentially connect through network 22 with a vast multitude of peers 20, use of low power wireless communication links 26 limits the number of potential connections at any given instant in time to those peers 20 which are physically proximate to one another. In other words, only when a first peer 20 resides in the detection zone 28 of a second peer 20 and that second peer 20 resides in the detection zone 28 of the first peer 20, can a connection through network 22 occur.

Rather than specifying a network unique address to initiate a connection, network 22 uses physical proximity along with a needs and capabilities evaluation (discussed below) to target a peer 20 with which a connection is desired. By not specifying a network-unique address to initiate a connection, user involvement in making connections is reduced and network addressing becomes dynamically configurable. Such an addressing scheme is useful in exchanging data between devices a user carries and comes into contact with on a daily basis. Relaying information between peers not in direct communication is also possible. For example, peer 20" may establish a communication link with peer 20'" via peer 20. In this case, peer 20 provides the relay interface between the other two peers.

Not all peers 20 are required to be portable devices. FIG. 1 shows communication link 30, which may or may not include a wireline link, connecting a peer 20' to public switched telecommunication network (PSTN) 32. Through PSTN 32, peer 20' may communicate with a vast assortment of remote devices 34, of which FIG. 1 shows only one. Peer 20' may be powered from a public power network (not shown) so that minimizing power consumption is not a significant design issue. While FIG. 1 depicts only PSTN 32 linking peer 20 to remote device 34, other local area network (LAN), wide area network (WAN) or communication links known to those skilled in the art may connect peers 20 to remote devices 34. Remote devices 34 may or may not themselves be peers 20. While network 22 uses proximity as a factor in targeting peers 20 to which connections are formed, the use of routing, gateway or relaying peers 20' permits connections to be extended over great distances through use of other networks.

Figure 2:
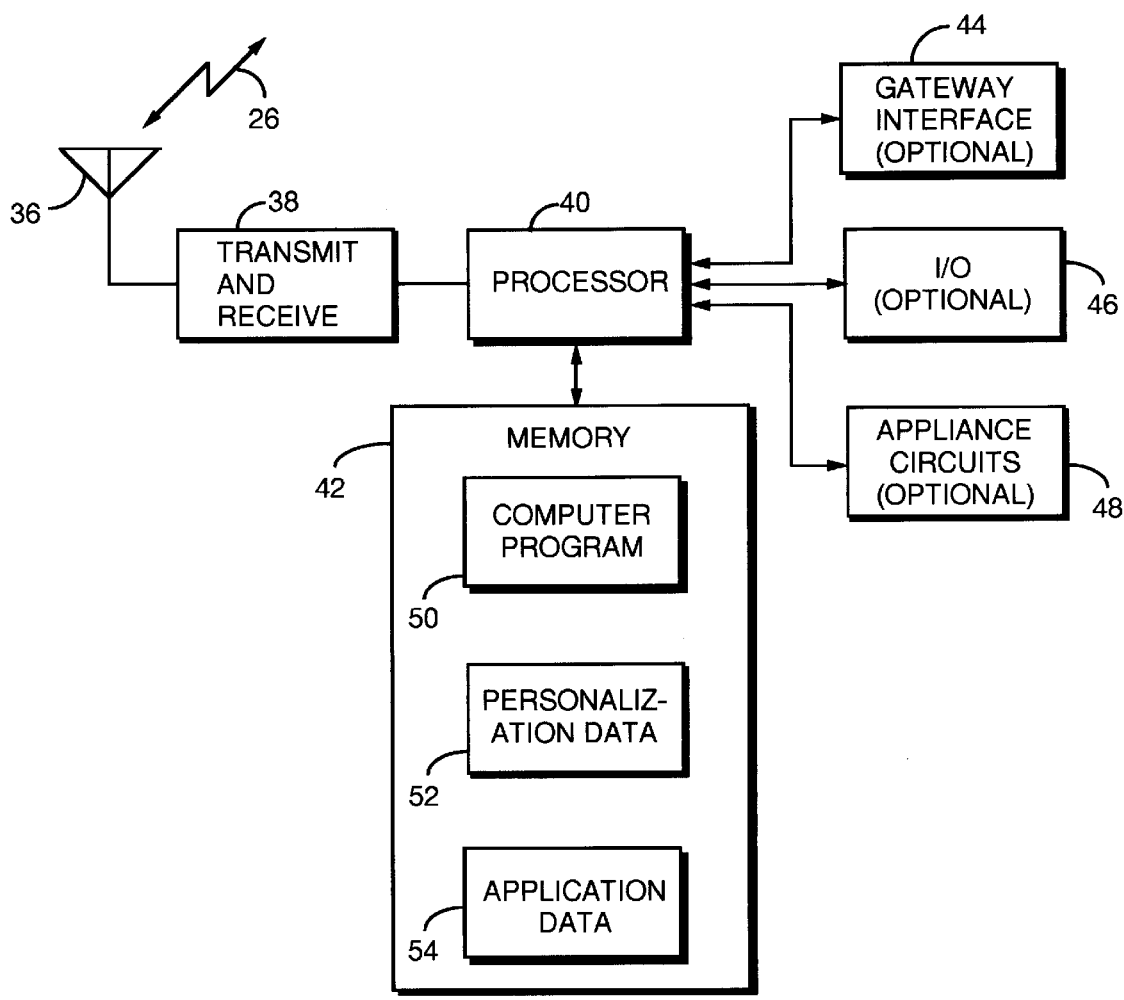
FIG. 2 is a block diagram of hardware included in a peer.

FIG. 2 is a block diagram of hardware 21 included in peer 20. Peer 20 includes antenna 36 configured to support wireless communication link 26. Antenna 36 couples to transmit and receive section 38. Transmit and receive section 38 is compatible with the protocols peers 20 use to communicate with one another. Transmit and receive section 38 couples to processor 40. Processor 40 couples to memory 42, optional gateway 44, communication link 30, optional I/O section 46, transmit and receive unit 38 and optional appliance circuits 48.

Processor 40 executes computer programs 50 which are stored in memory 42. Computer programs 50 define processes performed by processor 40 and peer 20. Memory 42 additionally stores personalization data 52 and application data 54. Personalization data 52 characterize a user or owner of peer 20 and may change from user to user or from time to time. ID codes, passwords and PINs are examples of personalization data as are radio or TV channel presets, language preferences and speed dial telephone numbers. Application data 54 are provided by performing peer applications and may change from moment to moment. A facsimile, a telephone number received over a pager, data scanned in using a bar code reader and a sound snippet received from a microphone or other audio source represent examples of application data.

In one embodiment, the present invention is realized as an integrated circuit for interactively coupling one or more communication nodes in a common network. The integrated circuit includes, in combination, a receiver for receiving input data, a transmitter for transmitting output data and a processor. The processor is coupled to the receiver and transmitter for interactively coupling a first common node to a second common node. The processor includes apparatus for activating a communications link between the first and second common nodes when the first and second common nodes are within a predetermined distance from each other and when needs and capabilities of said first and second common nodes overlap.

FIG. 3 shows a non-exhaustive list of examples of appliance circuits 48 which may be included in a peer 20. Referring to FIGS. 2 and 3, appliance circuits 48 may be configured as any type of a wide variety of everyday, commonly encountered electronically controlled devices, fixed or portable. Thus, a peer 20 may, in addition to being a peer 20, be a personal digital assistant (PDA), television, radio, CD player, tape player, copier, facsimile machine, telephone, cellular telephone, cordless telephone, pager, watch, computer, point of sale (POS) terminal, automated teller or other electronic device.

FIG. 4 shows a non-exhaustive list of gateways 44 which may be included in a peer 20. Referring to FIGS. 2 and 4, gateways 44 may be configured as any of a wide variety of relay, routing or protocol conversion devices known to those skilled in the art. For example, a peer 20 may, in addition to being a peer 20, be a modem which couples peer 20 to PSTN 32 (FIG. 1). Other gateways 44 may couple a peer 20 to LANs or WANs. Still other gateways 44 may couple a peer 20 modem to a satellite, a peer 20 cell phone to PSTN 32, a plain old telephone (POT) peer 20 to PSTN 32.

FIG. 5 shows a non-exhaustive list of I/O devices 46 which may be included in a peer 20. Referring to FIGS. 2 and 5, I/O devices 46 may be classified into input devices and output devices. Input devices may include keyboards, pointing devices, optical scanners, microphones and other well known input devices. Output devices may include printers, monitors, speakers and other well known output devices. Thus, in addition to being a peer 20, a peer 20 may be an I/O device 46.

Those skilled in the art will appreciate that gateways 44, I/O section 46 and appliance circuits 48 are not mutually exclusive categories. For example, many devices fall into multiple categories. For example, a computer considered as an appliance may include both an I/O section and a gateway. Likewise, a gateway may serve an I/O role.

Figure 6:
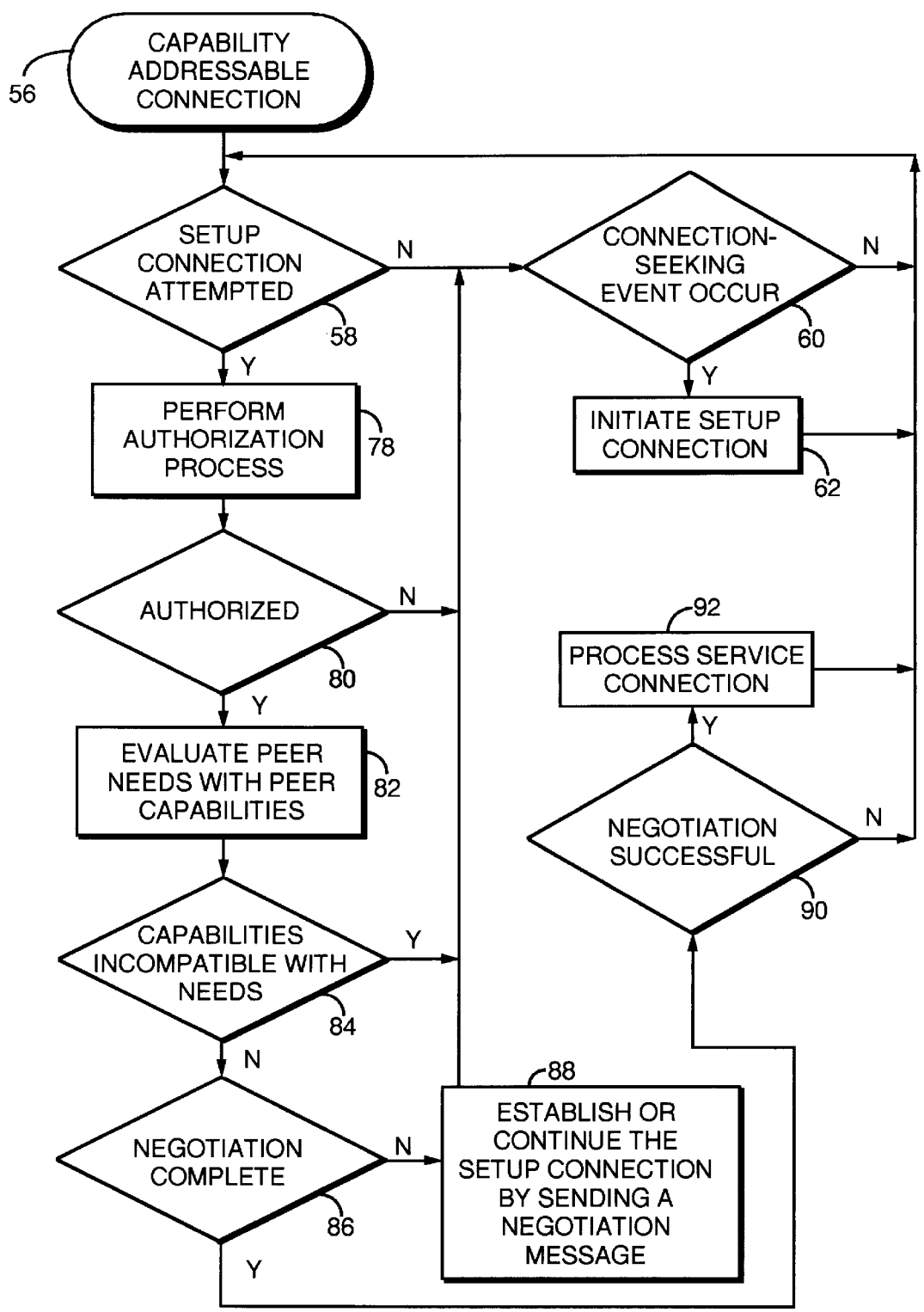
FIG. 6 is a flow chart of exemplary tasks included in a capability addressable connection process performed by a peer.

FIG. 6 is a flow chart of tasks included in a capability addressable connection process 56 performed by a peer 20. Process 56 is defined by a computer program 50 stored in memory 42 of peer 20 (FIG. 2) in a manner well known to those skilled in the art. In the preferred embodiments, all peers 20 perform a process similar to process 56.

Process 56 includes a query task 58 during which peer 20 determines whether a setup connection is being attempted. Generally, task 58 allows a first peer 20 to determine whether a second peer 20 is physically proximate to the first peer 20. Task 58 causes transmit and receive section 38 (FIG. 2) to monitor wireless communication link 26 (FIG. 1) to determine whether a signal compatible with a protocol being used by network 22 (FIG. 1) can be received. Due to the above-described low transmission power levels used by peers 20, when a signal is detected, the peer 20 sending the signal is located near the receiving peer 20.

When task 58 fails to determine that a setup connection is being attempted, a query task 60 determines whether a connection-seeking event has occurred. A connection-seeking event causes a peer 20 to seek out a connection with another peer 20. Connection-seeking events can be triggered using a periodic schedule. For example, connections may be sought out every few seconds. In this example, the schedule may call for more frequent periodic connection attempts from peers 20 which are powered from a public power network and less frequent connection attempts from peers 20 which are battery powered. Connection-seeking events can also be triggered upon the expiration of a fixed or random interval timer or upon the receipt of other external information. The other external information can include information obtained through appliance circuits 48, gateway 44 or I/O section 46 (FIG. 2), including user input.

If task 60 fails to determine that a connection-seeking event has occurred, program control loops back to task 58. If task 60 determines that a connection-seeking event has occurred, process 56 performs a task 62. Task 62 initiates an unsolicited setup connection. The setup connection is not addressed to any particular peer 20 of network 22. Rather, it is broadcast from the peer 20 making the attempt and will be received by all peers 20 within the detection zone 28 (FIG. 1) of the broadcasting peer 20. As discussed below, the broadcast signal need not be answered by another peer 20 even when another peer 20 is in detection zone 28. At this point, the broadcasting peer 20 need not know if any other peer 20 can receive the broadcast signal, and the broadcasting peer 20 may or may not know any particular needs or capabilities of other peers 20 should other peers 20 be sufficiently proximate so that a connection may be formed.

Task 62 initiates a setup connection by broadcasting a need/capability message 64, an exemplary format for which is depicted in FIG. 7. Referring to FIG. 7, message 64 includes an ID 66 for the peer 20 broadcasting message 64, an authorization key 68, a need specification 70, a capability specification 72 and can include other data elements. ID 66 is desirably sufficiently unique within the domain of network 22 so that it may be used in an addressed service connection, should the setup connection prove successful. Authorization key 68 includes one or more data codes which may be used by a receiving peer 20 in performing an authorization process. Needs specification 70 is a list of network needs currently experienced by the broadcasting peer 20. Capability specification 72 is a list of network capabilities which the broadcasting peer 20 may provide to other peers 20 of network 22.

Needs specification 70 may be determined by consulting a need table 74, an exemplary and non-exhaustive block diagram of which is depicted in FIG. 8. As illustrated in FIG. 8, data codes may be associated with a variety of network service needs which a service-requesting peer 20 may experience.

One exemplary need is that of appliance personalization. In the appliance personalization need example, a PDA might need to personalize nearby appliances. To satisfy this need, personalization data 52 (FIG. 2) should be programmed into certain nearby appliances without user intervention. As a result, the certain appliances will always be programmed with a particular user's personalization data whenever that user is near, without requiring action on the user's part, and regardless of prior persons who may have used the appliance.

Other exemplary needs can include that of printing application data 54 (FIG. 2), displaying application data 54, annunciating application data 54 at a speaker, routing connectivity to the Internet or other network resources, POS transactions, passage through secure areas or toll booths and the like.

Capability specification 72 may be determined by consulting a capability table 76, an exemplary and non-exhaustive block diagram of which is depicted in FIG. 9. As illustrated in FIG. 9, data codes may be associated with a variety of network capabilities provided by a service-providing peer 20. For example, a service-providing peer 20 capability can be that of appliance personalization. Thus, a peer 20 may be capable of being personalized by personalization data 52 (FIG. 2). Other examples include capabilities of printing, displaying, annunciating over a speaker, relaying a connection through the Internet or other network or POS terminal and unlocking a secured passageway, to name a few. In general, potential capabilities are compatible with potential needs.

Referring back to FIG. 7, need/capability message 64 includes those codes from tables 74 and 76 (FIGS. 8–9) that currently apply. While a peer 20 may have more than one need or capability at a given instant, nothing requires a peer 20 to have multiple needs or capabilities. Moreover, nothing requires a peer 20 to have both a network need and a network capability. Message 64 serves as a need message if a peer need is specified regardless of whether a peer capability is specified and as a capability message if a peer capability is specified regardless of whether a peer need is specified.

Referring back to FIG. 6, after task 62 broadcasts message 64 (FIG. 7), program control loops back to task 58. When task 58 eventually detects that a setup connection is being attempted by receiving a message 64, task 78 performs an authorization process. Task 78 uses authorization key 68 (FIG. 7) from message 64 to determine if the peer 20 attempting to setup a connection is authorized to connect to the receiving peer 20. Task 78 allows an owner of a peer 20 to restrict access to the owned peer 20 through network 22. The authorization process of task 78 may be used, for example, to restrict personalization capabilities of an appliance to a small family group. Alternatively, a peer 20 having a POS capability may perform an extensive authorization process before permitting a transaction to take place. A peer 20 having a need may also qualify the receipt of provided services depending upon the authorization process provided by task 78.

After task 78, a query task 80 determines whether the authorization process 78 authorized the attempted setup connection. If authorization is denied, program control loops back to task 60. The receiving peer 20 need not reply or otherwise acknowledge the attempted setup connection.

If authorization is accepted, a task 82 evaluates peer needs with peer capabilities. In other words, task 82 causes the message-receiving peer to compare its available capabilities (if any) to any needs listed in a received unsolicited need/capability message 64 (FIG. 7) and to compare its available needs (if any) to any capabilities listed in the message 64. After task 82, a query task 84 acts upon the result of the evaluation of task 82. When no internal capabilities match needs indicated in an unsolicited message 6 and no internal needs match capabilities indicated in an unsolicited message 64, neither peer 20 can be of service to the other. Program control loops back to task 60 and the receiving peer 20 need not reply or otherwise acknowledge the attempted setup connection.

At this point, the vast multitude of potential connections which a peer 20 may make within network 22 has been greatly reduced in scope without the use of network-unique addressing. The low power transmission scheme excludes most peers 20 in network 22 from being connectable at a current instant because most peers 20 will not be proximate one another. Of the few peers 20 which may be within each other's detection zones 28 (FIG. 1), the scope of potential connections has been further limited through the authorization process of task 78 and needs and capabilities evaluation of task 82. Additional exclusions on the remaining potential connections are performed through a negotiation process carried on between a service-requesting peer 20 and a service-providing peer 20.

When task 84 determines that capabilities and needs appear to be compatible, a query task 86 determines whether this negotiation process is complete. If the negotiation process is not complete, a task 88 establishes or otherwise continues the setup connection in furtherance of the negotiation process by sending an addressed negotiation message (not shown) to the peer 20 whose peer ID 66 (FIG. 7) was included in a just-received needs/capabilities message 64. The negotiation message can have a form similar to that of needs/capabilities message 64, but be specifically addressed to the other peer 20.

After task 88, program control loops back to task 60. Subsequent negotiation messages may, but need not, be received. If such subsequent negotiation messages indicate that both peers 20 to the prospective connection have completed negotiation, a query task 90 determines whether the negotiation was successful. When negotiation is not successful, program control loops back to task 58 and no service connection results. However, when negotiation is successful, process service connection procedure 92 is performed. During procedure 92, a one-to-one, addressed connection is established between peers 20 to perform network services. Upon completion of the service connection, program flow loops back to task 58

While nothing prevents capability addressable connection process 56 from relying upon user intervention during the setup connection process, user intervention is not required. Whether user intervention is required or not should depend upon the security, a priori knowledge and other considerations connected with the nature of the peers 20 involved. For example, peers 20 involved in financial transactions can benefit upon user intervention to ensure security. However, personalization of user-owned appliances and many other connection scenarios need not rely on user intervention.

Figure 10:
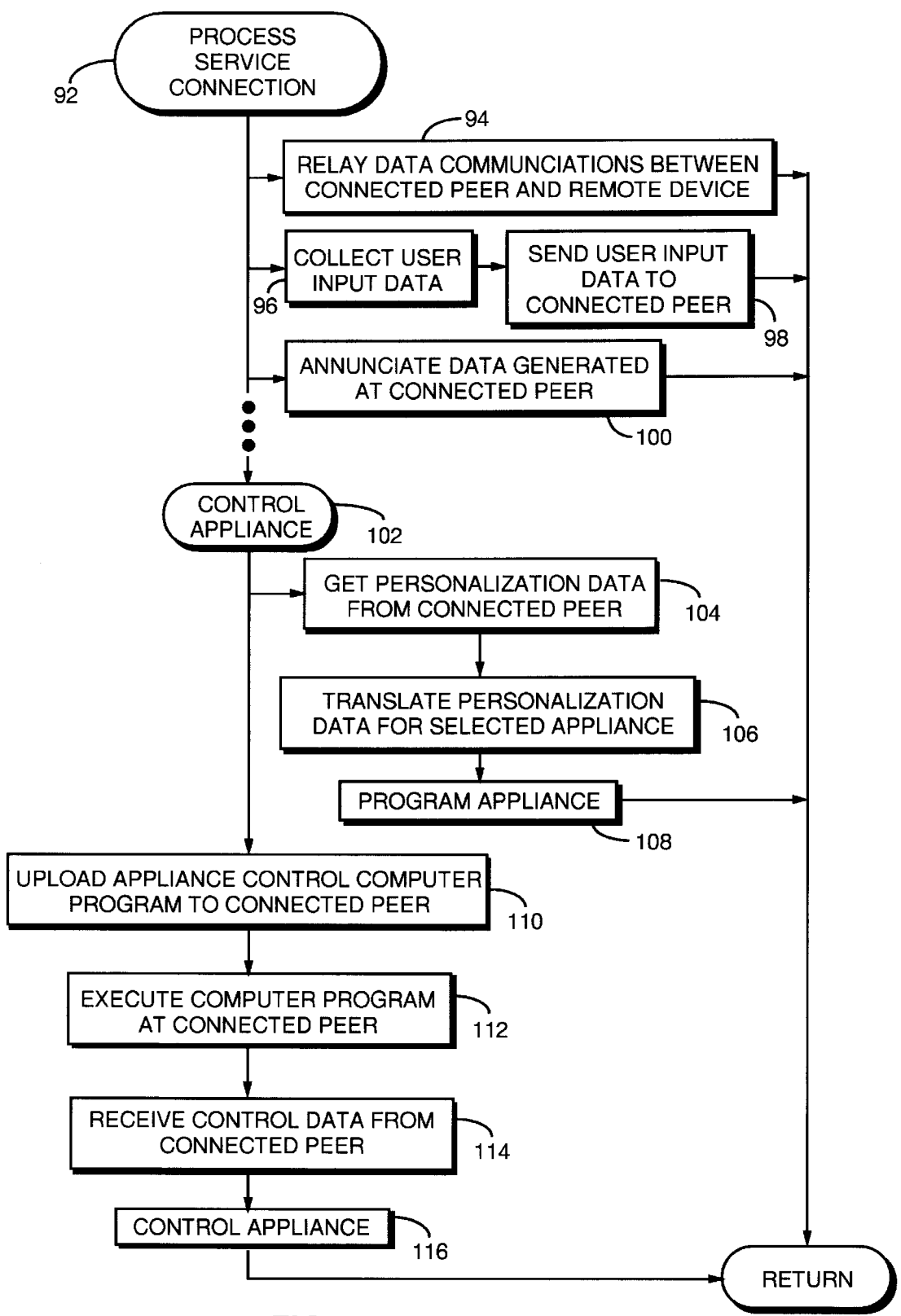
FIG. 10 shows an exemplary flow chart of a process service connection procedure performed at a peer.

FIG. 10 is a flow chart of process service connection procedure 92. Procedure 92 illustrates a collection of tasks which can be performed at a service-providing peer 20 in support of a service connection. Not all peers 20 need to be able to perform all the tasks depicted in FIG. 10. Likewise, many peers 20 may include other tasks which suit the nature of those particular peers 20.

Procedure 92 performs a task 94 to provide a network relay, router or gateway capability for a service-receiving peer 20 of network 22 through an established service connection. During task 94, a service-providing peer 20 relays data communications between the connected peer 20 and a remote device 34 (FIG. 1). After task 94, program flow returns to process 56 (FIG. 6). Task 94 may be used to extend the service connection to the Internet or other network.

Procedure 92 performs tasks 96 and 98 to provide a user input capability for a service-receiving peer 20 of network 22 through an established service connection. During task 96, the service-providing peer 20 collects user input from its I/O section 46 (FIG. 2). During task 98, the service-providing peer 20 sends the collected user input data to the connected service-receiving peer 20. After task 98, program flow returns. Tasks 96 and 98 may be used to control or program appliances from a PDA or other device which may have enhanced user input capabilities.

Procedure 92 performs task 100 to provide user output capability for any service-receiving peer 20 of network 22 through an established service connection. During task 100, the service-providing peer 20 receives data generated from the service-receiving peer 20 over the service connection and annunciates the data at an output device in its I/O section 46 (FIG. 2). The data may be annunciated in audibly and/or visibly perceivable format or in any other format(s) perceivable by human senses. After task 100, program flow returns. Task 100 may be used to annunciate data collected in a portable peer 20 at a non-portable annunciating device. Alternatively, task 100 may be used to annunciate data generated by a stationary appliance with limited I/O capability at a portable annunciating device.

Procedure 92 performs control appliance process 102 to support the controlling of appliances. Tasks 104, 106 and 108 of process 102 are performed to program an appliance peer 20 with personalization data 52 (FIG. 2). During task 104, a service-providing peer 20 gets personalization data 52 from the connected, service-receiving peer 20 using the service connection. Next, task 106 translates the network compatible personalization data 52 into a format suitable for the specific appliance to be programmed with personalization data 52. Those skilled in the art will appreciate that not all personalization data 52 available in a service-receiving peer 20 need to be applicable to all appliances. Thus, task 106 can use as much of personalization data 52 as applies to the specific appliance. After task 106, task 108 causes the appliance to be programmed with the translated personalization data 52. After task 108, program flow returns.

Tasks 110, 112, 114, 116 are performed to allow a user to easily control an appliance. These tasks can be performed on a PDA, for example, which has a display and user input capability exceeding the user I/O capabilities typically found on appliances. In this case, an appliance is a service-receiving peer 20 while the PDA is a service-providing peer 20. During task 110, the service-receiving peer 20 uploads an appliance control computer program to the connected service-providing peer using the service connection. Next, during task 112 the service-providing peer 20 executes the just-uploaded computer program. Task 112 causes the service-providing peer 20 to become specifically configured to provide a desirable user interface for the specific appliance being controlled. Next, during task 114 control data are received at the service-receiving peer 20 over the service connection. The control data originated from user input is supplied through the control computer program being executed on the service-providing peer 20. After task 114, task 116 controls the subject appliance in accordance with the control data received in task 114. After task 116, program flow returns.

EXAMPLE I

Figure 11:
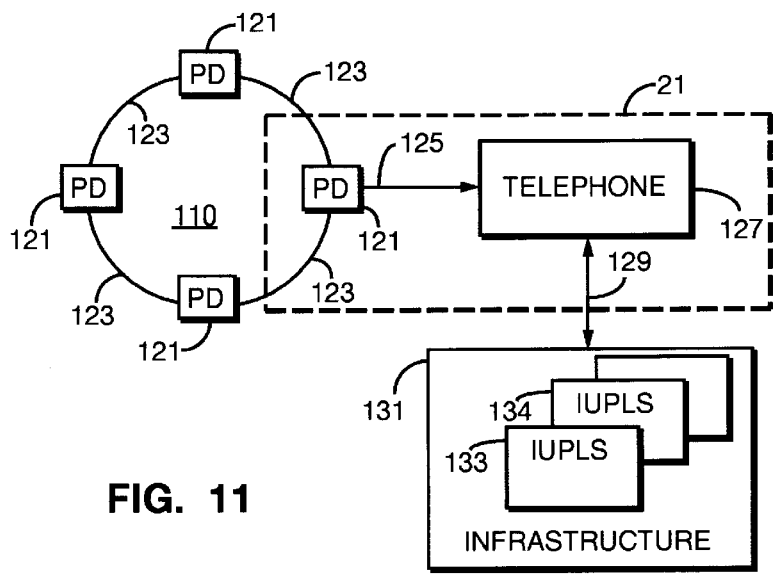
FIG. 11 is a block diagram illustrating relationships between a personal area network, a communications device and an external infrastructure.

FIG. 11 is a block diagram illustrating relationships between personal area network 120, communications device 127 and external infrastructure 131. Personal area network 120 comprises personal devices 121 interlinked via, for example, RF interconnections, represented as links 123. Personal area network 120 is linked to communications device 127 via RF link 125 and in turn via link 129 to external infrastructure 131 comprising, in this example, personalized records describing either an individual user's preferences, location and/or statistics (IUPLS 134) or a roaming user's preferences, location, local telephone number and/or statistics (RUPLS 133). Each of personal devices 121 and telephone 127 is equipped with a bidirectional RF linkage device such as RF linkage device 135 of FIG. 12.

Figure 12:
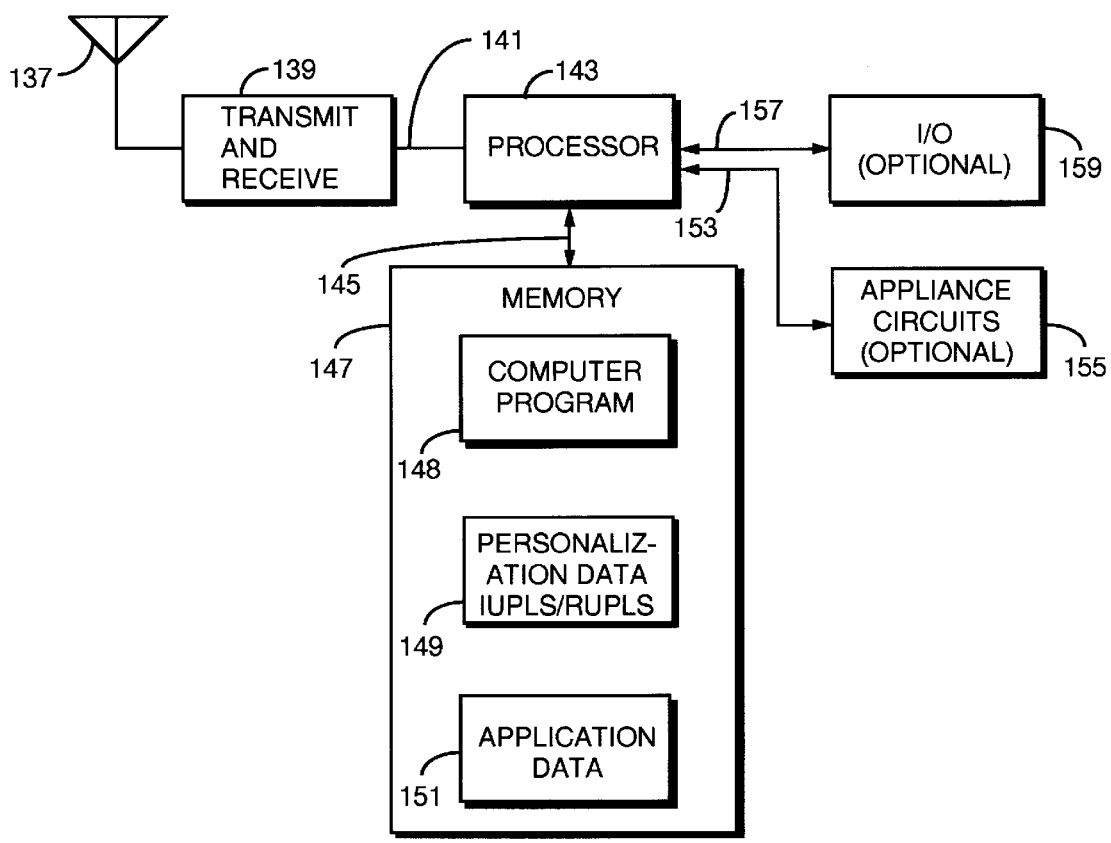
FIG. 12 is a block diagram of an exemplary peer communications and control device.

FIG. 12 is a block diagram of exemplary peer communications and control device 135, analogous to that of FIG. 2, comprising antenna 137 coupled to T/R module 139, processor 143, memory 147, optional I/O device 159 and optional appliance circuits 155, analogous to antenna 36, transmit and receive section 38, processor 40, memory 42, optional I/O section 46 and optional appliance circuits 48 of FIG. 2, respectively. Optional gateway interface 44 of FIG. 2 may be a separate element, as shown in FIG. 2, or may be subsumed under the aegis of optional I/O device 159, as in the system illustrated in FIG. 12. When present, optional I/O device 159 is linked to processor 143 via link 157 while optional appliance circuits 155 are linked to processor 143 via link 153. Processor 143 couples to T/R module 139 via link 141 and to memory 147 via link 145. Memory 147 includes computer program(s) 148, personal data 149 including IUPLS 133, RUPLS 134 and application data 151. Application data 151 includes device configuration preferences, network topologies and the like.

Appliance circuits 155 or 48 (FIG. 2) are adapted to interface to control systems associated with a given appliance. These may be included with the appliance when manufactured or appliance circuits 155 or 48 may be adapted to retrofit an appliance that was not manufactured with a personal networking capability. In either case, memory 147 includes data relevant to control of the appliance, such as internal commands, capabilities, interface protocol and/or interface commands as well as information allowing appliance circuits 155 or 48 to program and assert at least a measure of control over the appliance through commands generated by processor 143 in response to information coupled via antenna 26 or 137.

Memory 147 is configured to allow data therewithin to be rewritten or updated as circumstances change. An example of a transaction in which such changes occur is described in connection with FIG. 13 and associated text.

T/R module 139 (analogous to transmit and receive module 38, FIG. 2) is usefully a DTR-9000 from Radio design Group, Inc., 3810 Almar Road, Grants Pass Oreg. 97527-4550 while processor 143, memory 147 and optional I/O device 159 are usefully an MPC821 microprocessor available from Motorola of Phoenix Ariz., Austin Tex. and Schaumburg Ill.

Figure 13:
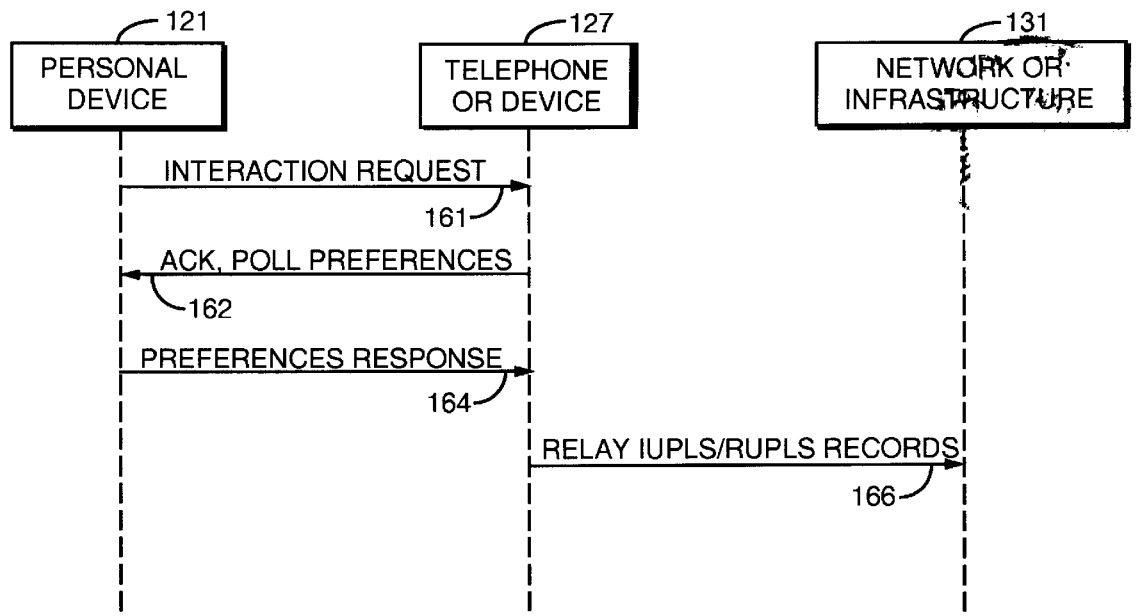
FIG. 13 is a diagram illustrating a sequence of data exchange messages between the devices of FIG. 11.

FIG. 13 is a diagram illustrating a sequence of data exchange messages between the devices of FIG. 11. Personal device 121 of FIG. 11 (analogous to device 20, FIG. 1) initiates the exchange of data with interaction request 161 directed to telephone 127, for example. Telephone 127 acknowledges interaction request 161 with message 162 and polls personal device 121 for preferences with message 162. Personal device 121 then provides preferences response 164 to telephone 127. Telephone 127 then sends message 166 to network or infrastructure 131 including location information and/or IUPLS 133 and/or RUPLS 134, depending on the nature of the data contained in preferences response 164. This type of interchange could occur when a person enters an area and the person's personal communications device begins to interact with a network of appliances that are relatively fixed in some environment. For example, a client who walks into a doctor's office might have a personal digital assistant that interacts with the appliances in the doctor's office to tell the infrastructure where the person is and to have all calls to the person's home and/or office telephone rerouted to the doctor's office phone. This type of transaction is described below with reference to FIG. 14 and associated text.

Figure 14:
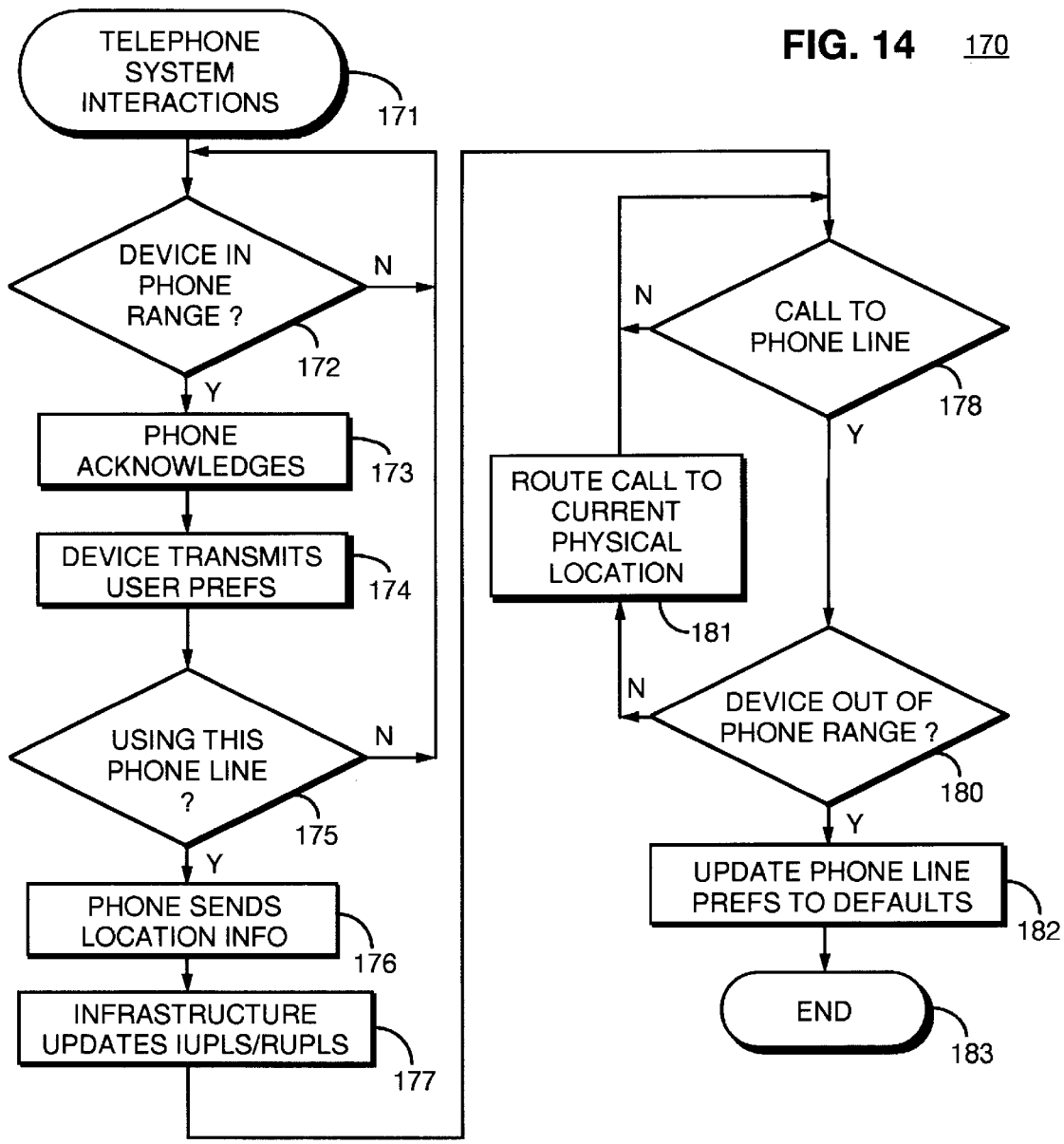
FIG. 14 is a flow chart outlining steps in the data communications sequence of FIG. 13 for the devices of FIG. 11.

FIG. 14 is a flow chart of process 170 outlining steps in data communications sequence 160 (FIG. 13) for devices 121, 127 (FIG. 11). Process 170 begins with telephone system interactions 171 with telephone 127 (FIG. 11). When the process determines that personal device 121 is in range of phone 127 (block 172), telephone 127 acknowledges that personal device 121 is in range (block 173). In return, personal device 121 transmits user preferences (block 174).

When personal device 121 indicates that the line coupled to telephone 127 is not to be used to transmit data or when personal device 121 is determined (block 172) not to be in range of phone 127, control loops back to block 172. When personal device 121 indicates (block 175) that the line coupled to phone 127 is to be used to transmit or receive data, phone 127 sends location information (block 176) to infrastructure 131. The location information describes the location and telephone number(s) for telephone 127, which includes the location of the user because the user is within range of telephone 127. This information is used to update RUPLS 134 when telephone 127 is not the user's phone or in the user's usual haunts and is used to update RUPLS 134 and IUPLS 133 when the user returns home or to the office. When this phone line is not to be used, for whatever reason, program control loops back to block 172. Additionally, when physical motion of the personal device 121 or when another personal device 121 through which personal device 121 is establishing connection to the network moves out of range, the program steps through decision block 180 to update preferences to defaults (block 182) or to set them to those from another personal device 121 that is in range of the television.

When a call is made to the user's home or office phone (block 178), the call is routed to the user's current location (block 181) provided that the system determines that the user is still within range of telephone 127 (block 180). When it is determined that the user is no longer within range of telephone 127 (block 180), telephone 127 updates the phone line preferences to default values (plus any deriving from interactions that telephone 127 may be having with other users). Process 170 then ends (block 183).

EXAMPLE II

Figure 15:
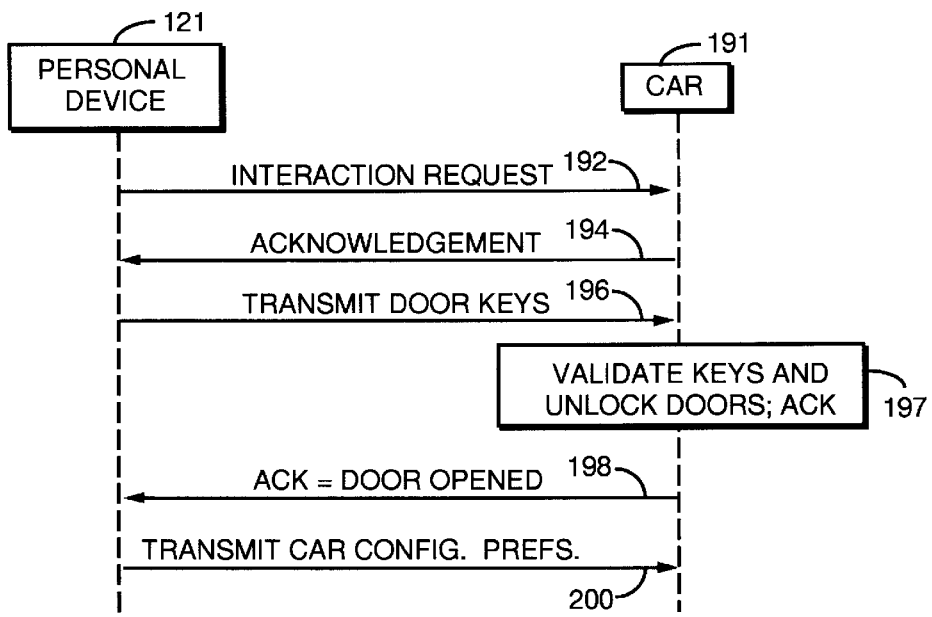
FIG. 15 is a diagram illustrating a sequence of data exchange messages between another set of devices.

FIG. 15 is a diagram illustrating sequence 190 of data exchange messages between another set of devices 121, 191.

In this example, personal device 121 is carried by a user who is approaching, for example, rental car 191, which is equipped with and controlled by a peer analogous to personal devices 121 (FIG. 11), 135 (FIG. 12) or peers 20 (FIG. 1), 21 (FIG. 2). Personal device 121 transmits interaction request 192. Car 191 transmits acknowledgment 194 back to personal device 121 via hardware 135, 21. Personal device 121 transmits car keys (electronic codes unique to car 191) to hardware 135 or 21 in car 191 (car keys were previously loaded into personal device 121 in the course of making arrangements for rental of car 191). Car 191 then validates the car keys via hardware 135, 21, unlocks the doors and acknowledges receipt of the car keys (block 197), again via hardware 135, 21.

Acknowledgment message 198 from hardware 135, 21 of car 191 to personal device 121 coincides with opening of the car door by the user. Personal device 121 transmits car configuration preferences to hardware 135, 21 of car 191 in message 200. Car 191 then accommodates as many of these preferences as possible, by setting seat position and height, mirror adjustments, lighting levels and personal device adjustments (i.e., setting a radio to a desired station etc.). These operations are described in more detail with reference to FIG. 16 and associated text.

Figure 16:
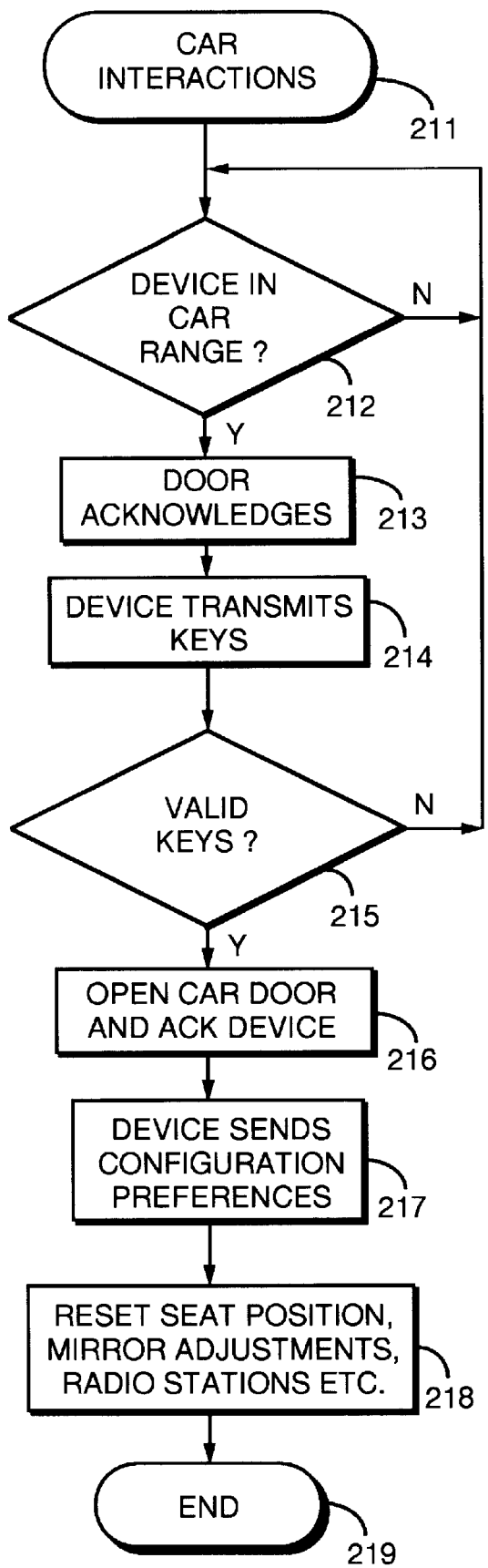
FIG. 16 is a flow chart outlining steps in the data exchange sequence of FIG. 15.

FIG. 16 is a flow chart of process 210 outlining steps in data exchange sequence 190 of FIG. 15. Process 210 begins when personal device 121 forms a personal network with car 191 (block 211) via hardware 135, 21. When step 212 determines that personal device 121 is in door range of hardware 135, 21, an acknowledgment signal is sent (block 213) from hardware 135, 21 of car 191 and personal device 121 transmits car keys (block 214). Car 191/hardware 135, 21 then determines if the car keys are valid (block 215).

When personal device 121 is not in range of hardware 135, 21 of car 191 or when the car keys are determined not to be valid for this car 191 (block 215), program control loops back to block 212. When the car keys are determined to be valid (block 215), car 191 unlocks and opens the car door and sends an acknowledgment to personal device 121 (block 216) via hardware 135, 21. Personal device 121 then sends configuration preferences to hardware 135, 21 of car 191 (block 217). Car 191 then accommodates these preferences as described above in conjunction with text associated with FIG. 15 and process 210 then ends.

EXAMPLE III

Figure 17:
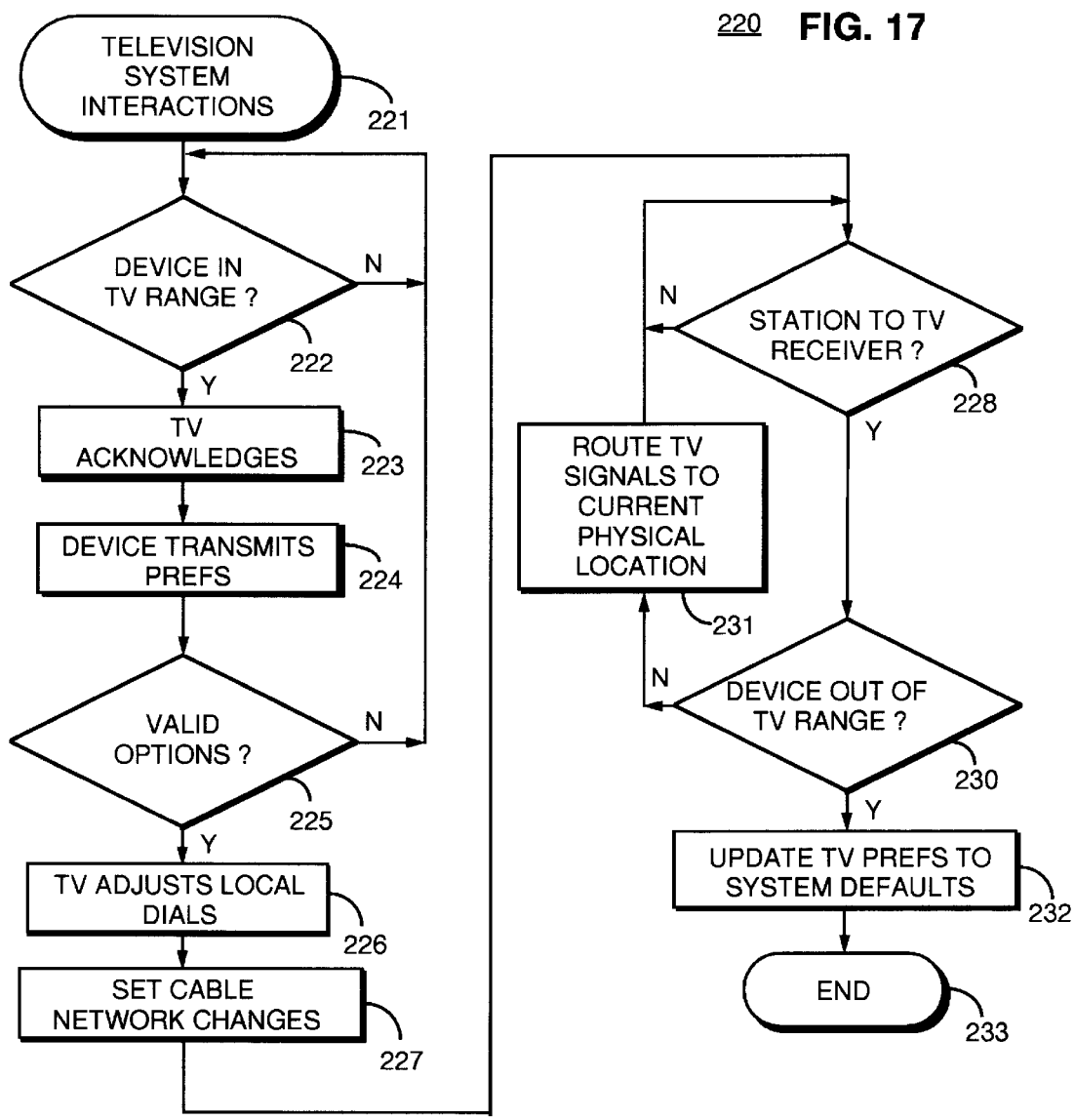
FIG. 17 is a flow chart outlining steps in a data exchange sequence between yet another set of devices.

FIG. 17 is a flow chart of process 220 outlining steps in a data exchange sequence between yet another set of devices. Process 220 begins (block 221) when it is determined (block 222) that personal device 121 comes in range of a television (e.g., by the periodic "pinging" process described elsewhere). The television acknowledges (block 223) presence of personal device 121. Personal device 121 transmits (block 224) preferences such as channel or network, volume level, contrast and the like. When the options or preferences are not valid options for this television or when personal device 121 is not in range of the television, control loops back to block 222. The television otherwise accommodates these preferences (block 226) and sets any cable network changes that are transmitted (block 227).

In response to the messages that were sent in conjunction with the tasks of block 227, the system routes the desired station to the television receiver (block 228), Additionally, when physical motion of the personal device 121 takes it out of range of the television, or when another personal device 121 through which personal device 121 is establishing connection to the network moves out of range of the network/television, the program steps through decision block 230 to update TV preferences to system defaults (block 232) or to set them to those from another personal device 121 that is in range of the television. When this does not occur, the chosen TV signals are routed to the TV (block 231) and displayed. Process 220 then ends (block 233).

EXAMPLE IV

Figure 18:
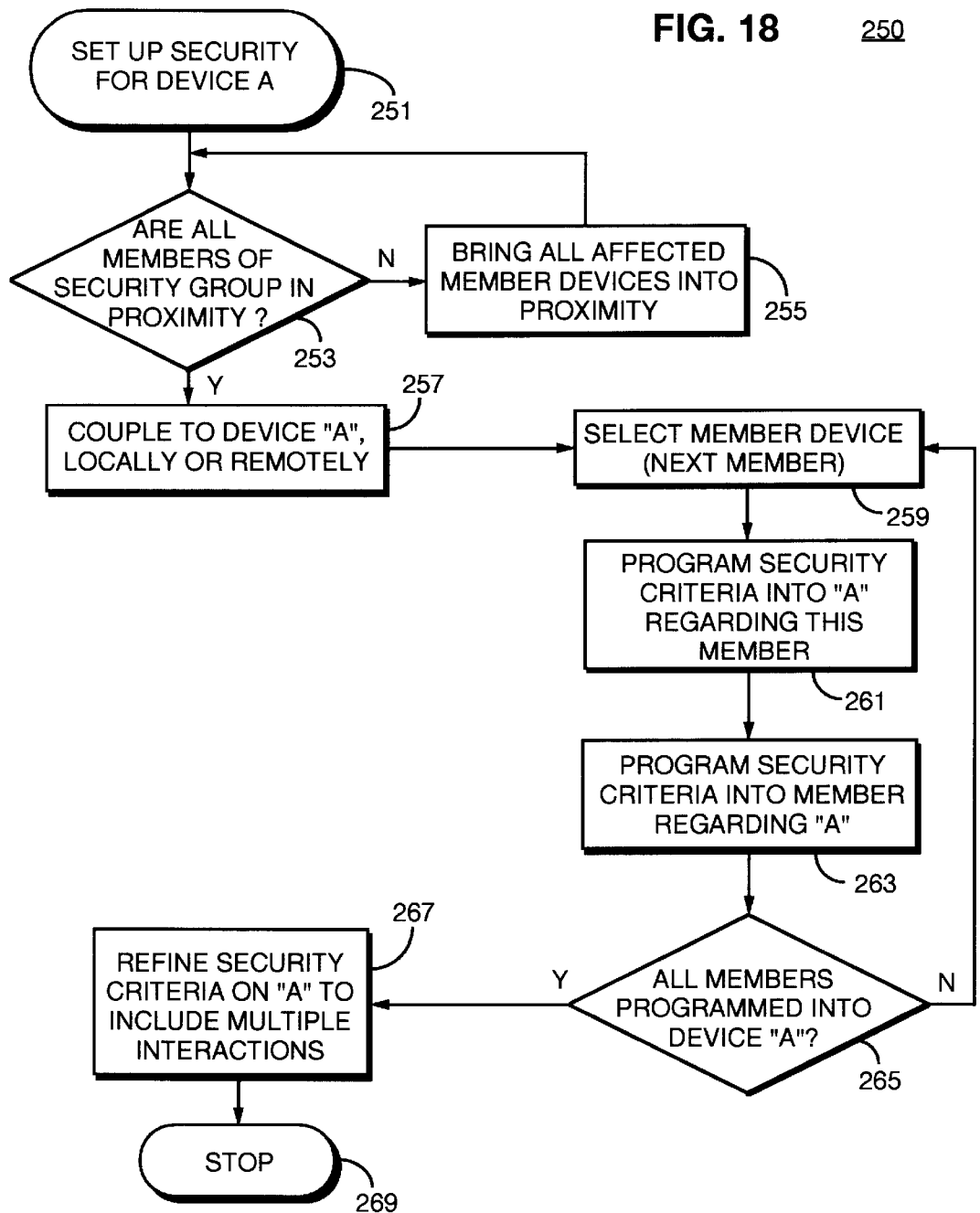
FIG. 18 is a flowchart outlining a procedure for the introduction of a new appliance into an established personal area network.

FIG. 18 is a flowchart outlining procedure 250 for the establishment of security criteria for device A. Procedure 250 assumes that (i) the person programming device A has authority to do so (based on an ownership code, password and the like) and (ii) the person programming each of the member devices has the authority to do so (based on an ownership code, password and the like). A member is a device that device A expects to be in proximity with; when the member device is not in proximity, device A may be missing. Rules governing the proximity relationship can be determined by the person having authority to do so.

For example, the proximity relationship could be to limit either or both the number of communication relays or the physical distance separating the member devices from device A. An example of how this can be accomplished is by each communication being tagged with a relay count, i.e., a count that is incremented each time a message passes from one device 121 to another device 121.

When devices 121 come into proximity, they detect each other (see FIG. 1 and associated text). At this point, they could potentially network together but they have not yet done so. After a short negotiation, each device 121 decides whether it wants to network with the other device 121. When both devices 121 agree to participate in a dialog, devices 121 couple, i.e., are in data communication. Note that a dialog between two devices 121 beyond the initial negotiation may never occur, but they are considered to be coupled because they know of each other's existence, they have a mechanism established for communication and they have agreed that they can participate in a dialog.

On the contrary, devices 121 that are in proximity may elect not to participate in a dialog with each other, and, even though they are capable of detecting each other, they are not networked. This situation might occur because two devices 121 are owned by two different individuals, and each device 121 has been instructed that it is only to dialog with other devices 121 owned by the same individual. In this way peer devices 121 can selectively ignore other devices 121 even though they are in proximity. This can be accomplished with unique ownership identification codes, or some other technique well known to those skilled in the art.

This technique serves the situation where a first person has devices 121 in an apartment where they are in proximity to another person's devices 121 in another apartment. Even though these devices 121 can detect each other, they will not network together if they have been programmed to only network with other devices 121 owned by the same individual. Of course, other authorization schemata exist and could be employed by those skilled in the art, e.g., devices 121 can be networked together and separated into disjoint sets called security sub-groups.

Procedure 250 begins (block 251) when the security criteria for a specific device 121 ("device A") is to be programmed into device A. In the case where devices 121 do not have intrinsic input capabilities, this programming may be effected via an RF link, hardwired link or optical link; at the opposite end of the chosen link there is an interface device, such as a keyboard, voice recognition system or similar device, for programming device A. The first step determines (block 253) if all devices 121 of a specific security group are in proximity or in data communication with device A. When this is not the case, the program may either strive to effect communication with the available network or wait until the missing member devices 121 are brought into proximity/data communication with the network (block 255).

In either case, the coupling step (block 257) precedes programming device A with information that may desirably contain the security needs regarding other devices in device A's security group (blocks 259–265).

In particular, a member device is selected (block 259), security information relevant to member device 121 is programmed into device A (block 261) and security information relevant to device A is programmed into member device 121 (block 263). Additionally, device A may be programmed to be recognized by one or more of the following: a security group unit serial number, a unique security group identifier that identifies the owner, a physical address and/or a telephone number for the usage site and the like.

Security criteria for member devices 121 may involve specifications that are both inclusive and exclusive. For example, an inclusive specification might be "when I no longer see device B then I am missing". An exclusive specification might be "If I see device D then I am missing".

Desirably, when all such member devices 121 in the security group have been programmed with each other's data, security information with respect to device A is refined to include multiple interactions (block 267) and program 250 ends (block 269). For example, suppose that device A's security group includes three devices named B, C and D. In block 267 the security criteria contained within device A could be refined with inclusive statements like "If any two of the devices B, C, D are absent for two hours or more then I am missing". The criteria could also be refined with exclusive statements like "If I ever see devices C and D within three minutes of each other then I am missing".

When it is not the case that all member devices 121 have been programmed with each other's data, control reverts to block 259, another member device 121 is selected and the steps of blocks 259–265 are repeated until all member devices 121 nominally comprising the security group have been programmed.

Note that when a security group is established for device A, the security group exists with respect to device A only. For example, suppose device A has one member device B in its security group. On the other hand, device B may define a security group of its own, e.g., with device C as its member. This does not, however, establish any implied relationship from B to A, nor between A and C. So just because B is a member of A's security group does not imply that A is a member of B's security group, nor does it imply that C is a member of A's security group. This scheme allows for great flexibility in the implementation of the present invention.

Figure 19:
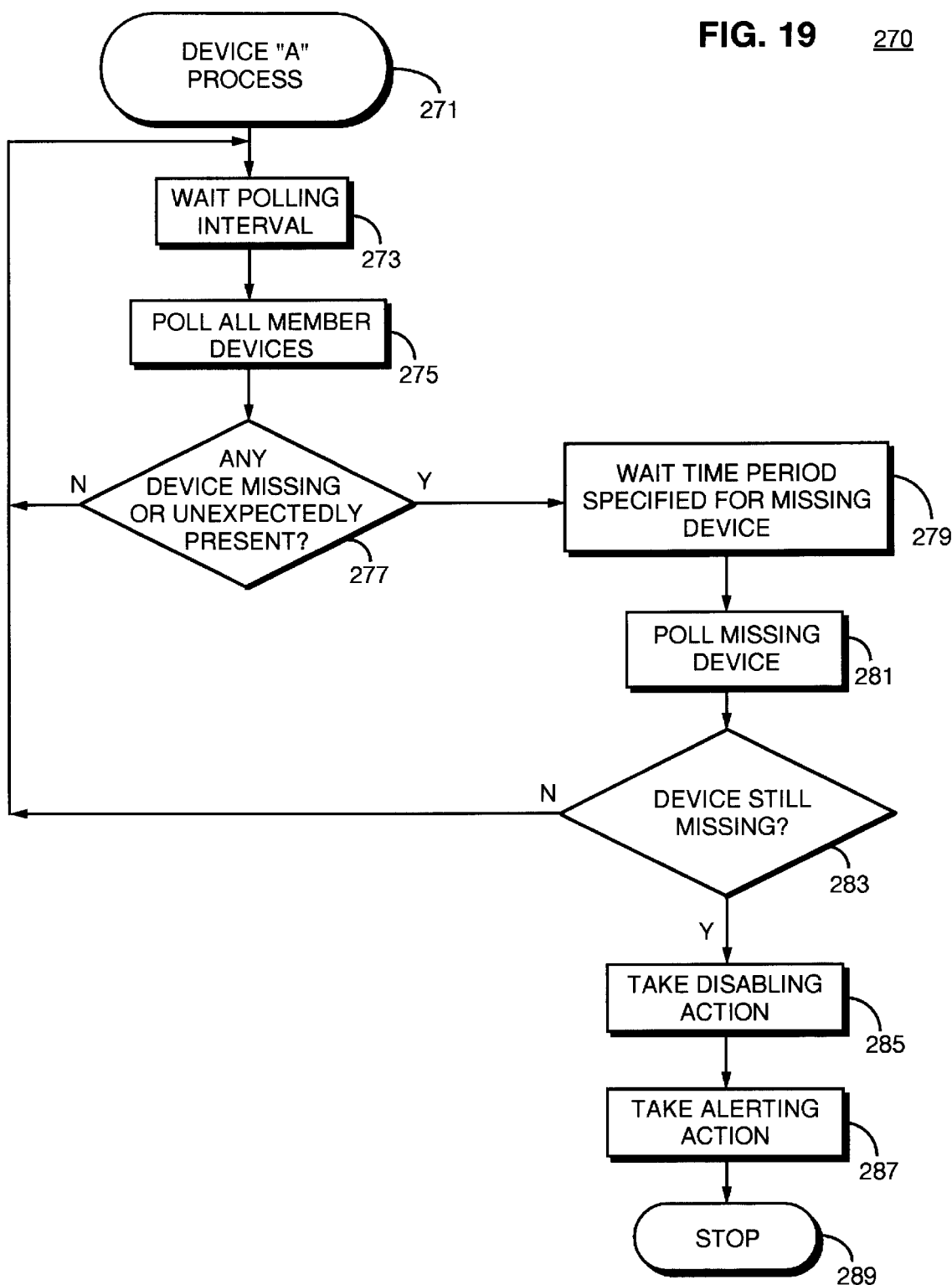
FIG. 19 is a flowchart outlining a polling/alarm procedure for use in a personal area network.

FIG. 19 is a flowchart outlining polling/alarm procedure 270 for use in conjunction with a security group. Procedure 270 begins (block 271) by device A waiting a prescribed polling interval (block 273). The polling interval may be specific to the nature of device A and may vary from a very short (e.g., five minutes) polling interval in some cases to relatively long polling intervals for other types of devices (e.g., a day).

Following the polling interval wait, device A may poll all members 121 in the security group (block 275) to determine whether or not they are in proximity. When this has been accomplished, device A determines (block 277) if any members 121 are missing from the security group and if any devices are unexpectedly present. When no members 121 are missing from the security group and no devices 121 are present that are not expected, program control passes back to block 271/273 and steps outlined in blocks 273–277 repeat at appropriate intervals.

When it is determined (block 277) that a member 121 is missing from the security group, or that an unexpected member 121 is present, device A waits (block 279) a specified interval for the return of the missing device, or for removal of unexpectedly present devices, and then polls (block 281) the missing or unexpectedly present member. When the member 121 is determined (block 283) not to be actually missing, control passes to block 271/273 and steps outlined in blocks 273–277 are repeated. When the member 121 is determined (block 283) to actually be missing or unexpectedly present, affirmative action such as taking steps to disable the device (block 285) and/or raise an alarm (block 287) is taken, prior to procedure 270 ending (block 289).

The alarm condition may include having device A (i) shut down (block 285), (ii) attempt to place a call to police for help (block 287), (iii) attempt to place a call to a central appliance authority for help or for an override code (block 287), or (iv) interact with neighboring devices (block 287), in order to attempt to place a call per (ii) or (iii). When an ordinary telephone line is used to effect the call, the physical address is usually easily determined from the identity of the line on which the call is placed.

EXAMPLE V

FIGS. 20 through 25 address application of concepts previously discussed to the setting of a remote controller for an appliance.

Figure 20:
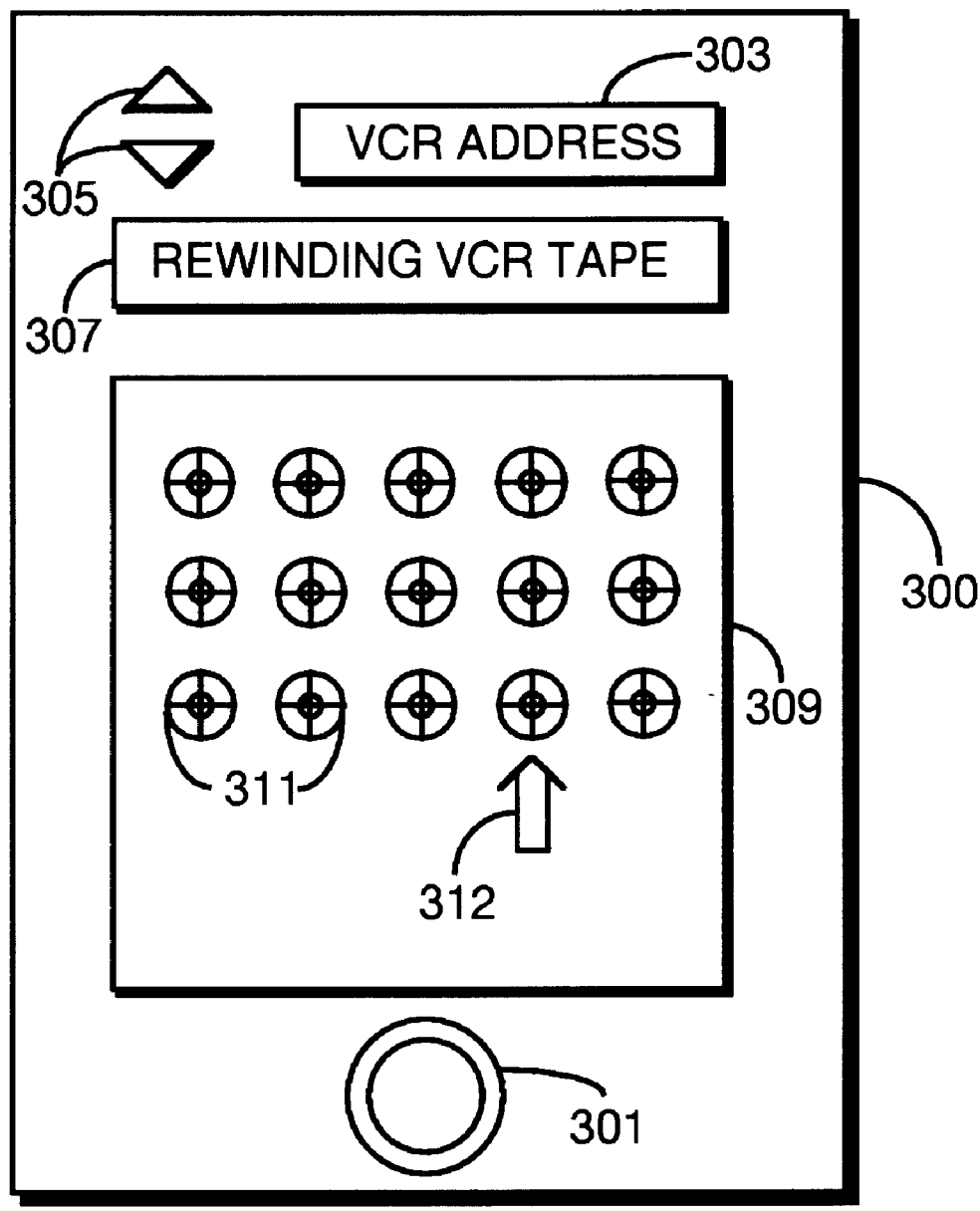
FIG. 20 is a simplified exemplary plan view of a remote controller for a video cassette recorder in accordance with the present invention.

FIG. 20 is a simplified exemplary plan view of a first preferred embodiment of remote controller 300, adapted for use with a video cassette recorder, in accordance with the present invention. Controller 300 includes three displays 303, 307, 309, with display 303 for showing address notifications, display 307 for showing those commands that will be transmitted to the device controlled by controller 300 and display 309 showing icons 311 corresponding to available commands. Cursor 312 indicates which of icons 311 is selected, with display 307 providing a textual description or identification of the selected command. Track ball 301 allows an operator to move cursor 312 between different icons 311 in order to select a specific icon 311. Buttons 305 allow switching of addresses displayed in display 303.

Figure 21:
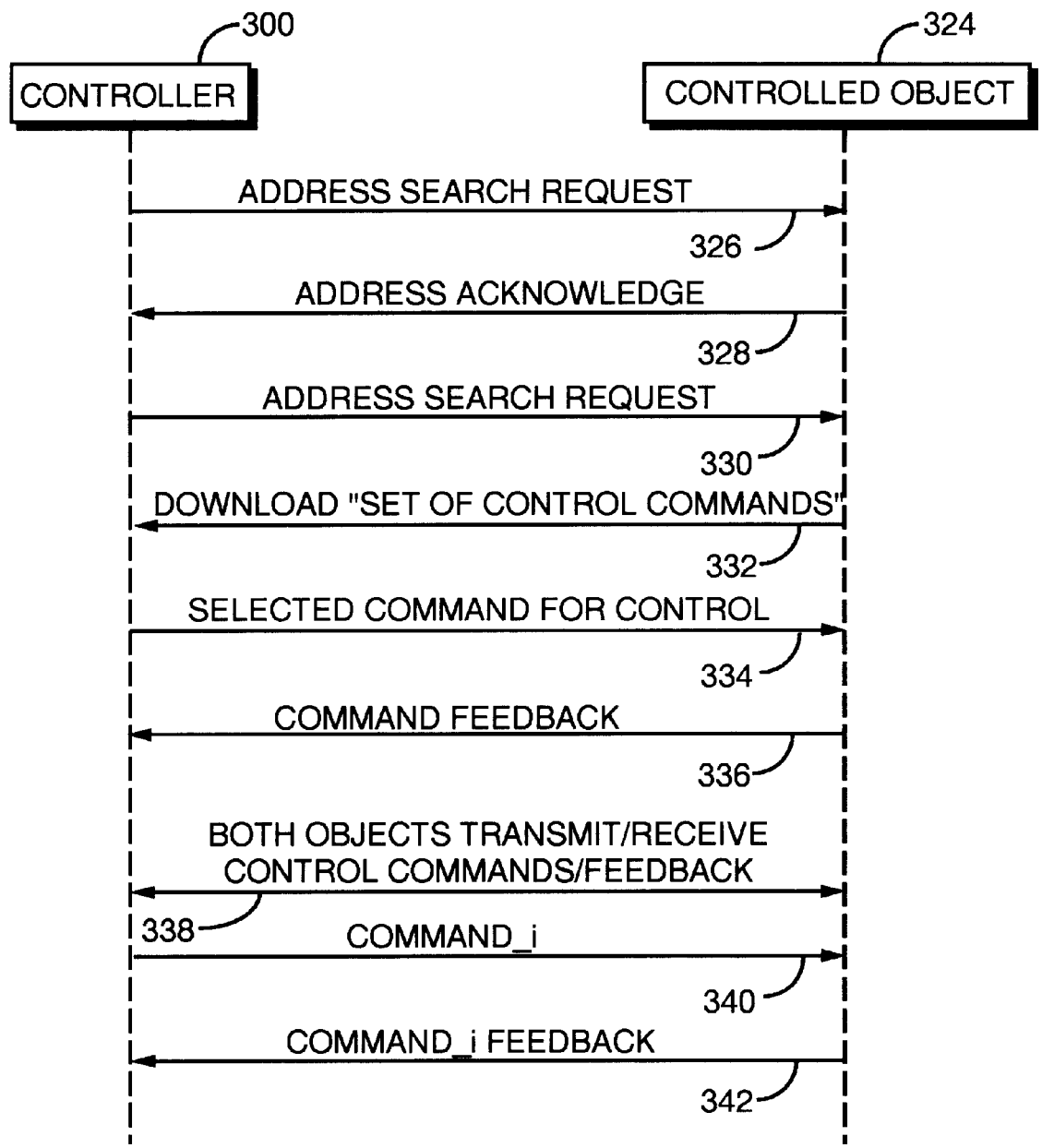
FIG. 21 is a diagram illustrating a sequence of data exchange messages between a controller and a controlled object.

FIG. 21 is a diagram illustrating sequence 320 of data exchange messages between controller 300 and controlled object 324. The process initiates with address search request 326 going from controller 300 to controlled object 324 via devices such as peer communications and control device 135 (FIG. 12) or hardware 21 (FIG. 2) in each of controller 300 and controlled object 324. Address acknowledgment 328 informs controller 300 that controlled object 324 is in data communication with controller 300. Controller 300 then sends request 330 that a command set for controlled object 324 be downloaded.

Controlled object 324 then downloads (download "set of control commands" 332) a set of such commands to controller 324. At this point, controlled object 324 has sent a set of commands/actions that it can perform at the behest of controller 300. Those commands selected by the user of controller 300 are sent (selected command(s) for control 334) to controlled object 324 and controlled object 324 provides command feedback 336, including at least an acknowledgment that the command or commands were received. Both controllee 324 and controller 300 send and receive commands and feedback 338 as the user sets the preferences chosen from the list previously sent in download "set of control commands" 332 and this continues through to a last, or $i^{th}$, command (command_i 340) and feedback (command_i feedback 342).

Figure 22:
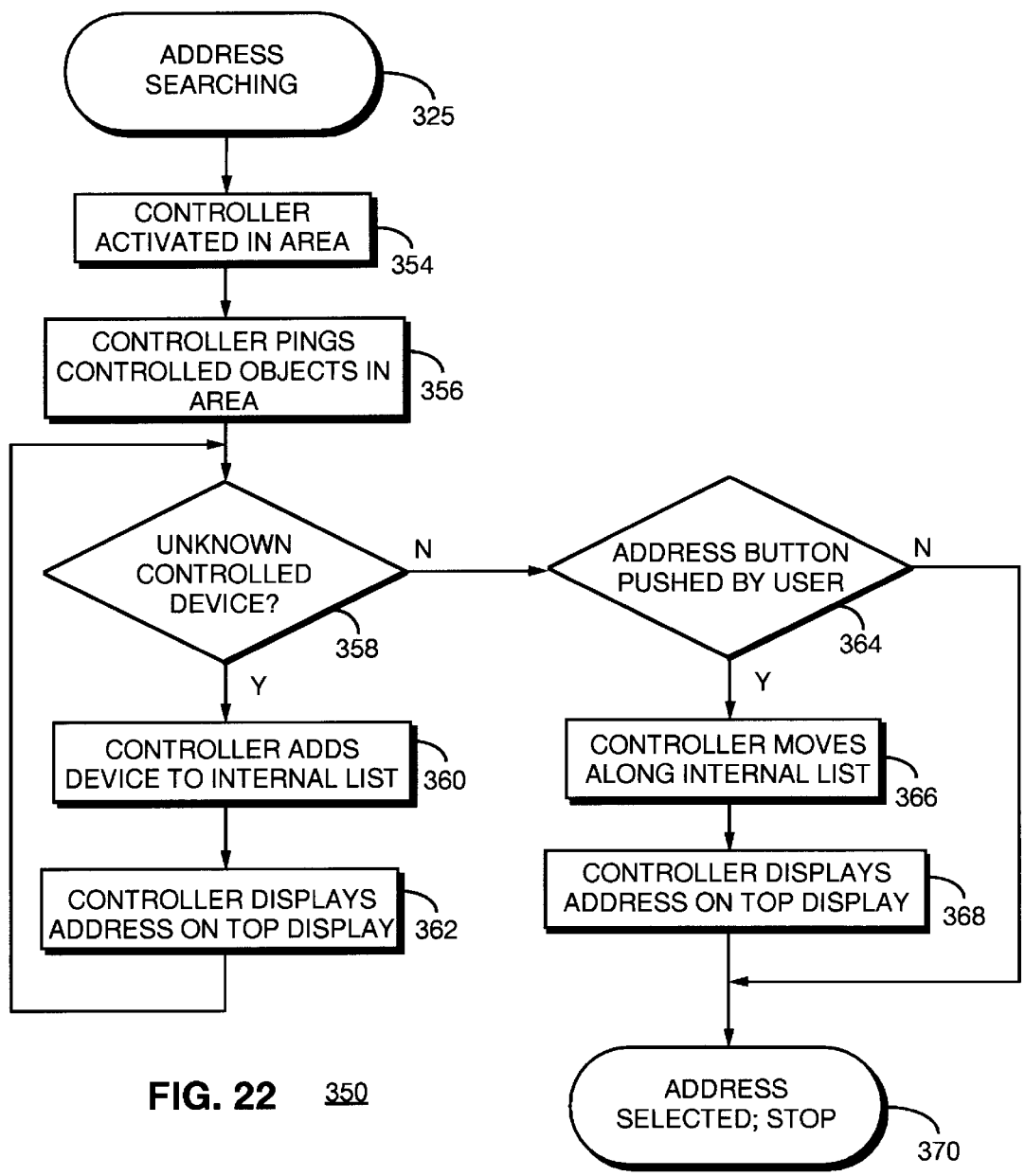
FIG. 22 is a flow chart illustrating a sequence of steps in a process for selecting an address.

FIG. 22 is a flow chart illustrating a sequence of steps in process 350 for selecting an address. Process 350 begins (block 325) when the user initiates address searching for an appliance. Controller 300 is activated in an area that will allow interaction of controller 300 with a personal area network (block 354) and controller 300 "pings", or sends interrogative messages to, controlled objects 324 within that personal area network (block 356). When the responses indicate (block 358) that a controlled object 324 unknown to controller 300 is part of, or in communication with, the personal area network, controller 300 adds (block 360) the new controlled object 324 to an internal list (i.e., stores data in memory 42, FIG. 2, or memory 147, FIG. 12). Controller 300 also displays (block 362) an address corresponding to new controlled object 324 on display 303 (FIG. 20) and then iterates steps 358–362 until no new controlled objects are encountered within the personal area network.

When controller 300 determines (block 364) that an address button has been pushed or selected by the user, controller 300 increments (i.e., displays sequentially-listed addresses) an internal list of addresses (block 366); otherwise, process 350 ends (block 370). After incrementing sequentially-listed addresses (block 366), controller 300 displays (block 368) an address on display 303 (FIG. 20). The steps outlined in blocks 364–368 are repeated until the user stops incrementing and displaying addresses.

Figure 23:
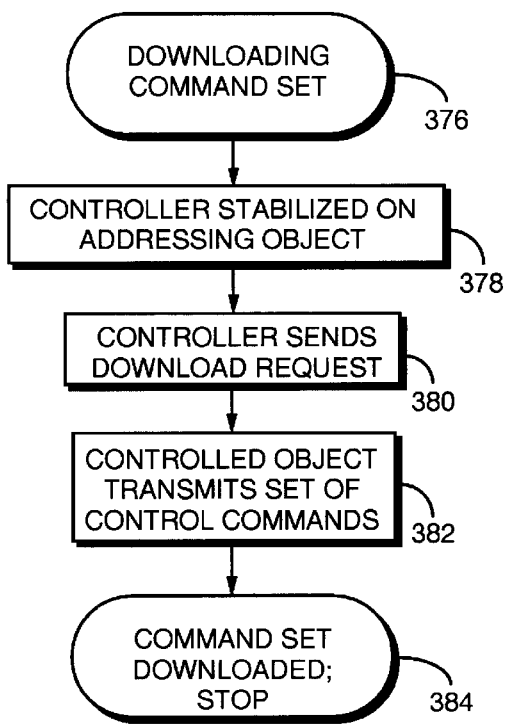
FIG. 23 is a flow chart illustrating a sequence of steps in a process for downloading a command set.

FIG. 23 is a flow chart illustrating a sequence of steps in process 375 for downloading a command set. Process 375 begins (block 376) with controller 300 stabilized on addressing controlled object 324 (block 378), e.g., when the user stops incrementing addresses in steps 364–368 of process 350 (FIG. 22). Controller 300 then sends a download request (block 380) to controlled object 324 (see also download "set of control commands" 332, FIG. 21, and associated text). When controller 300 determines that the command set has been downloaded, process 375 ends (block 384).

Figure 24:
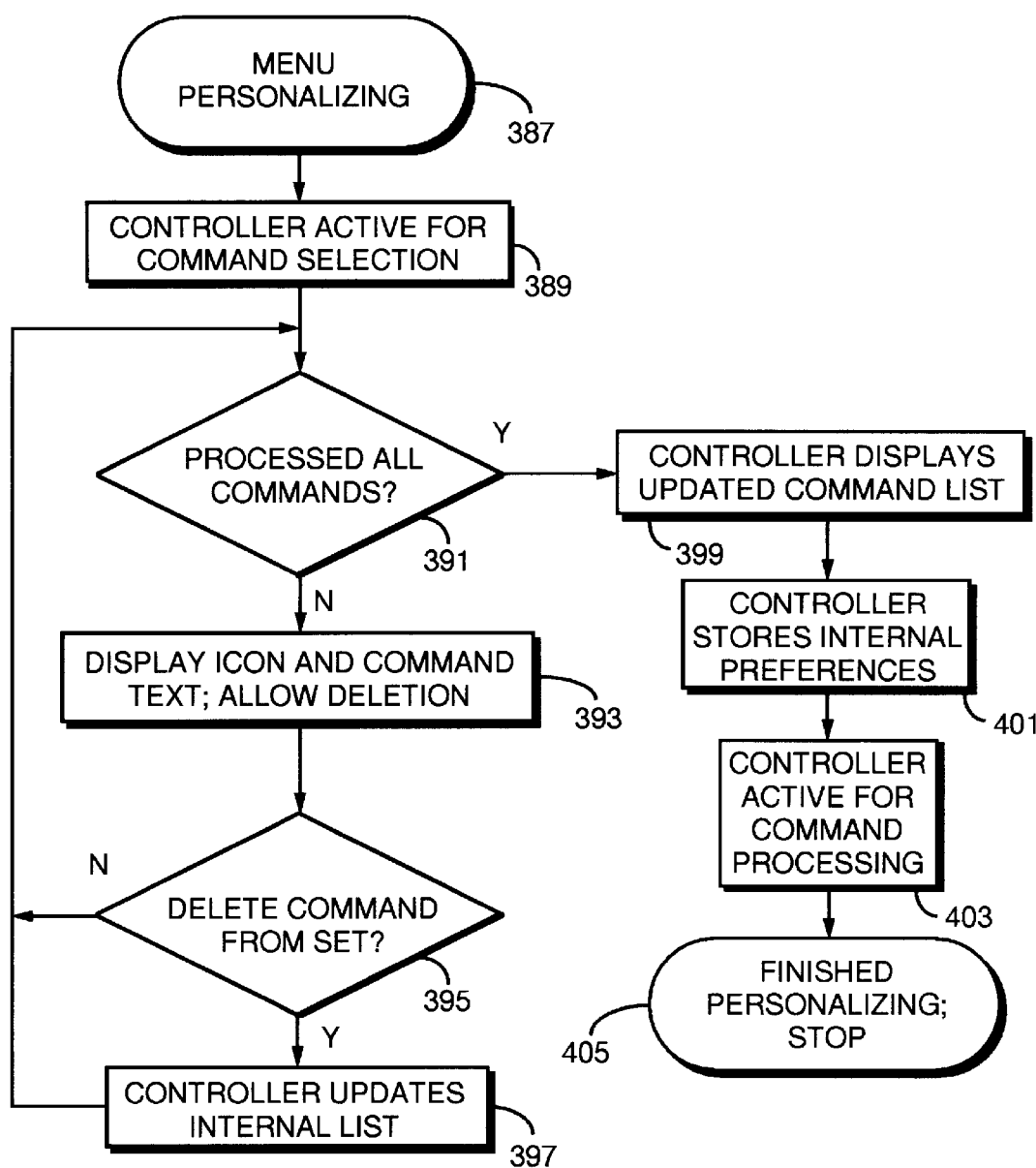
FIG. 24 is a flow chart illustrating a sequence of steps in a process for personalizing choices in a menu.

FIG. 24 is a flow chart illustrating sequence 385 of steps in a process for personalizing choices in a menu. Process 385 begins (block 387) with controller 300 active for command selection (block 389) (i.e., after having completed items 332–342, FIG. 21, process 375, FIG. 23). Controller 300 determines (block 391) if all commands have been processed; if so, control passes to block 399; otherwise, controller 300 next displays (block 393) a suitable icon 311 (FIG. 20) and command text and allows deletion of a command from the command set by the user.

When controller 300 determines (block 395) that the user wants to delete a command, controller 300 updates its internal list (block 397) of commands and steps 391–397 are repeated until it is determined that all commands have been processed (block 391). When controller 300 determines (block 395) that the user does not want to delete a command, control passes back to block 391 and steps 391–397 are repeated until it is determined that all commands have been processed (block 391).

When controller 300 determines that all commands have been processed (block 391), controller 300 displays an updated command list (block 399) and stores (block 401) user preferences internally (e.g., in memory 42, FIG. 2, or memory 147, FIG. 12). Controller 300 is then active for command processing (block 403) and process 385 ends (block 405) with the internally-stored command set having been personalized to the user's preferences.

Figure 25:
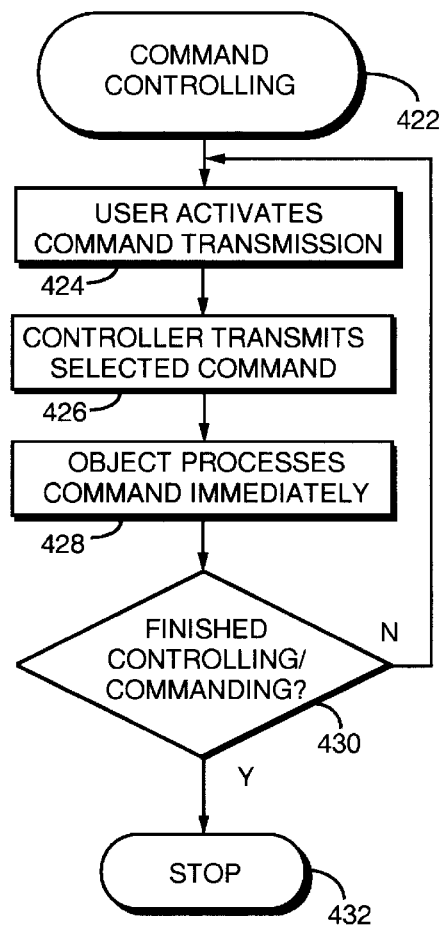
FIG. 25 is a flow chart illustrating a sequence of steps in a process for effecting a command from a remote controller.

FIG. 25 is a flow chart illustrating a sequence of steps in process 420 for effecting a command from remote controller 300. Process 420 begins (block 422) with the user activating (block 424) transmission (block 426) of a command from controller 300 to controlled object 324. Controlled object 324 processes the command (block 428) immediately. When the controlling and commanding process is determined to be complete (block 430), process 420 ends (block 432) and when it is determined that the controlling and commanding process is not complete (block 430), process 420 loops back to block 424 and the steps outlined in blocks 424–430 are repeated.

EXAMPLE VI

Personal data, such as those pieces of information that one might carry in their wallet or purse, are digitized (or their functional equivalent is represented in a digital format) and carried with one in a device that has a form factor similar to a wallet. Various form factors will emerge, but this device is carried instead of a traditional wallet, in whatever physical form is useful or desirable. This means that it preferably fits into a man's pocket or a woman's purse. The device is able to interact with other short-range wireless devices in close proximity observing the same protocol and thereby transact business. For example, the counterpart to this device during a transaction might be a "network-compliant digital wireless cash register". This device, an example of a personal data storage and transaction device, is the personal database that one might carry as the focal point of a personal area network and performs functions that would collectively lend themselves to the name "electronic wallet".

The present invention consists of the following components:

1) The basic peer-to-peer communication module as detailed in FIGS. 2 and 12 and associated text. Some optional portions of a peer-to-peer communication node that are unique to personal transaction and storage device 407 (FIGS. 26–29) are listed below.

2) A user interface permitting (i) data entry and (ii) data display. Data entry could be accomplished via a number of well-known techniques including a physical keyboard, handwriting recognition, character recognition, voice and/or word recognition and/or a virtual keyboard with a point-and-click-mouse-type interface. The data display could be accomplished via a number of well known techniques including a virtual display or a graphics display unit.

3) Memory for database capabilities.

In addition to the hardware capabilities listed above, the following functional capabilities are present in personal transaction and storage device 407:

1) Generalized database capabilities including storage of data, placement of data, retrieval of data and navigation through data. Such capabilities can refer to data being stored locally on personal transaction and storage device 407 or to data stored remotely on another device but accessed via personal storage and transaction device 407.

2) The ability to select specific data from the database and transmit it to one or more third parties over a wireless link.

3) The ability to accept data being transmitted by a third party and to save that data in the database of personal transaction and storage device 407.

4) Capability for storing and broadcasting an identifier or indicator of the person's presence or location relative to the data transactions, e.g., capability for storing and broadcasting information indicating that the owner of this device is currently present with the device.

5) The ability to accept command codes over the wireless link and to execute the program/command codes locally on the unit.

6) The ability to accept control codes from another peer-to-peer communications device 121/21, and the ability to remotely control the device using the downloaded control codes.

In one embodiment, portions of the present invention are realized as an integrated circuit for interactively coupling one or more communication nodes in a common network. The integrated circuit includes, in combination, a receiver for receiving input data, a transmitter for transmitting output data (collectively referenced as 38 in FIG. 2) and processor 40. Processor 40 is coupled to receiver/transmitter 38 for interactively coupling a first common node 121/21 to a second common node 121/21 (see FIG. 11 and associated text). Processor 40 includes apparatus for activating a communications link between the first and second common nodes 121/21 when the first and second common nodes 121/21 are within a predetermined distance from each other and when needs and capabilities of said first and second common nodes 121/21 overlap.

In this manner, personal transaction and storage device 407 can interact with barcode reading pen 490 (FIG. 33) or other equipment that assists in communications or transactions. For example, communications between buyer 452 (FIG. 30) and merchant 456 can be executed over this type of communications link.

The present invention digitizes information and stores it in a device having the form factor of a wallet. It also includes capacity for moving the information easily from one such device to another over the peer-to-peer wireless short-range link. The present invention can accept command codes that causes its behavior to adapt to the environment. For example, when interacting with an ATM (Automated Teller Machine), the display painted on personal transaction and storage device 407 could become a user interface to the ATM. This is a capability where behavior is not hard-coded into personal transaction and storage device 407 at the time it is manufactured or sold, rather, the behavior is dynamically loaded into personal transaction and storage device 407 based on context and may be erased when the application to which personal transaction and storage device 407 is being put has ceased or finished.

FIGS. 26–29 are a series of sketches of views of portable, hand-holdable digital device 407 for storing data and effecting transactions.

FIGS. 26 and 27 are schematic diagrams depicting core functionality on two sides of personal transaction and storage device 407. Personal transaction and storage device 407 optionally contains several folded or hinged layers of display/output-unit panels 408, 409 and soft-key input-unit panels 410, 411, 412, 413, 414. In this fashion, personal transaction and storage device 407 can be unfolded in multiple directions, with each set of display/output-unit panels 408, 409 and soft-key input-unit panels 410, 411, 412, 413, 414 providing functionality in one domain. Examples of two domain fold-outs are shown in FIGS. 28 and 29.

In FIG. 26, top panel or fold-out 408 is used for output displays or hardware based output-units, e.g., speakers. Bottom panel 418 is used for touch-sensitive screen displays or hardware based input-units, e.g., buttons 410, track-ball or microphone (the latter two are not illustrated). Below bottom panel 418 is a row of optional buttons 410 that control configurations of the one-sided device functional domain. For example, physical buttons 410 can be located on the bottom to activate or select different soft-key input-units to be displayed on lower panel 418. Distinction between upper panels 408 and lower panels 418 is a simplistic example, particularly applicable to personal transaction and storage device 407 having fold-outs that separate in an upper and lower portion. Some implementations may have a left and right sides in place of, or in addition to, upper and lower.

Top panel 408 also contains optional slide-out unit 416 which can be extended to help create a third panel operating within a selected functional domain. For example, the panel can be extended to allow for another input pad used for entering a memo or notes.

In a preferred embodiment, panels 408, 409, 410, 411, 412, 413, 414, 415, 416, 417, 418 are touch-sensitive to allow for button selection and/or handwriting entries. Personal transaction and storage device 407 includes peer-to-peer communications node 21 and/or 121 (see FIGS. 2 and 11 and associated text) coupled, through wireless communications link 26 (FIG. 2), with barcode reading pen 490 (see FIG. 33 and associated text, infra), also functioning as a pointing and touch-sensitive-panel-writing element, that also includes peer-to-peer communications node 121/21. This coupling enables rapid and automated financial/data transactions through personal transaction and storage device 407. Examples of these barcode pen 490 to personal transaction and storage device 407 interactions are detailed below.

FIGS. 26–29 provide different views of a preferred embodiment of personal transaction and storage device 407. This exemplary configuration includes two functional domains, operating as a personal digital organizer and a telephone. FIG. 26 schematically illustrates personal transaction and storage device 407 with flip-up display 408 on one of two sides, where this side operates as a personal digital organizer. The personal digital organizer of personal transaction and storage device 407 includes upper panel 408 that includes output displays 417 on panel 408, lower panel 415 that includes touch-sensitive soft-key input panel 418, a row of control/configuration buttons 410, slide-out panel 416 functioning as a memo pad and pen 490 (see FIG. 33, infra) capable of reading barcodes and operating as a touch-sensitive-panel-writing element.

FIG. 27 schematically illustrates the other side of the preferred embodiment, which covers another functional domain, operating as a telephone. This side has flip-up panel 409 including speaker 419. Lower panel 413 contains soft-key inputs 421 functioning as telephone buttons. The lowest row of buttons 414, below lower touch-sensitive panel 413, contains some configuration/control buttons and a microphone that accepts vocal and other aural inputs.

FIG. 28 schematically illustrates an upper, sideways view that emphasizes that this rendition of a personal transaction and storage device 407 has two sides and two functional domains. FIG. 28 primarily shows the side with the telephone, and highlights the fact that flip-up sections 408, 409 are disposed on both sides. FIG. 29 takes an opposite side view than that of FIG. 28, and shows primarily the side with the personal digital organizer.

Figure 30:
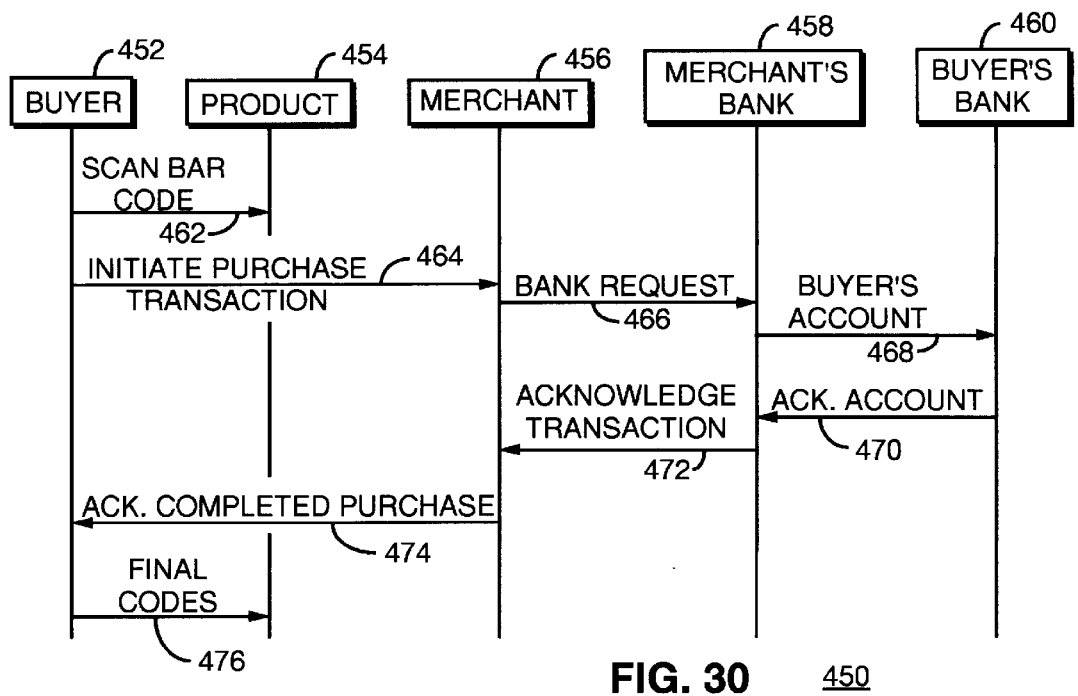
FIG. 30 is a diagram illustrating a sequence of data exchange messages between parties involved in a financial transaction.

FIG. 30 is a diagram illustrating a sequence 450 of exemplary data exchange messages 462–476 between parties 452–460 involved in a financial transaction, e.g., between personal transaction and storage device 407 and several objects involved with a financial transaction, and the data transfers associated with a particular financial transaction. Since personal transaction and storage device 407 has capability for omnidirectional, higher ranging, wireless connections, users can interact with devices throughout a retail store. With these enhanced communications capabilities, a buyer can perform financial transactions and can negotiate exchanges of security information.

The following methodology describes a merchant-assisted, self-closing transaction system. Retail merchandise is purchased with the implicit actions of three parties: (1) a buyer, (2) a merchant and (3) one or more financial institutions. Self-closing transactions can be easily achieved with (i) an electronic three-way transaction, involving buyer, merchant and banking system or (ii) with electronic cash interactions between the buyer and the merchant.

The system is based on a simplified interaction between buyer and merchant, to enable either mode of electronic financial transactions, i.e., three-way transactions or cash exchange interactions. Current systems require that an implicitly defined and agreed-upon financial system be used for a given purchase. For example, current credit card users have an implicit agreement between a credit-card institution and the merchant to read information from the credit card and activate transactions for purchasing. Even modern inventions continue to use the implicitly defined infrastructure access, e.g., paging systems with secure electronic transactions.

Figure 33:
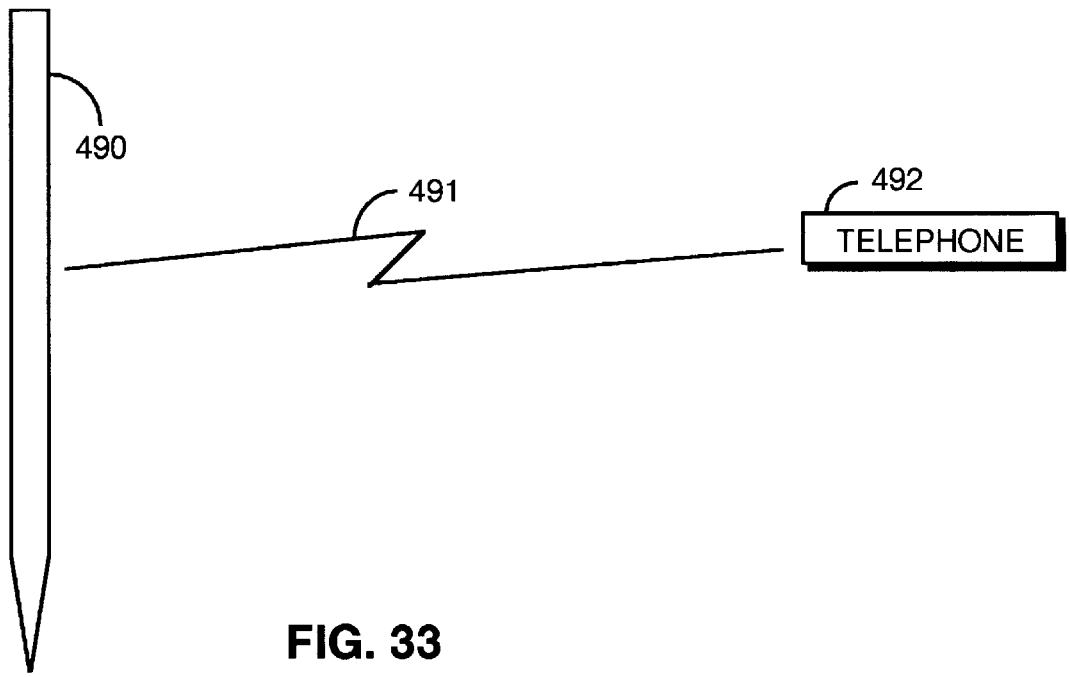
FIG. 33 is an exemplary configuration of a barcode reading pen and the telephone functions on one side of the Personal Store and Transaction Device.

The following steps, illustrated in FIG. 30, explain exemplary financial transactions used in three-way electronic purchases. Process 450 begins with buyer 452 scanning 462 the bar-code on the product with barcode reader 490 (FIG. 33). This can be magnetic information or common UPC bar-coded lines. The financial transaction is initiated 464 by the buyer after carrying out the scanning 462 step.

Financial transactions comprise a three-way mechanism involving the buyer, the merchant and a set of banking sources (in this case, just the merchant's bank and the buyer's bank). User 452 needs to supply a bank account or credit card number and also needs to relay product information which helps banking resources 458, 460 determine the price and allows merchant 456 to control inventory and security.

After merchant 456 parses out the price and product information, along with the buyer's banking information, merchant 456 initiates a banking request 466 to merchant's bank 458. Merchant's bank 458 then initiates appropriate financial transactions 468 with the buyer's bank, most likely a simple transfer request to cover the cost of the requested purchase. Once merchant's bank 458 receives acknowledgment 470 of the financial transaction from buyer's bank 460, the information can be processed for the merchant's account. Merchant's bank 458 sends acknowledgments 472 to merchant 456. Merchant 456 receives the acknowledgment of financial transfers 472 and sends tailored information 474 back to buyer 452. Along with this acknowledgment, desirably the product code, receipt and generalized product tags associated to the purchase transactions are sent to buyer 452. Buyer 452 can then record financial transaction information and generalized product tags 476 on the product.

Process 450 modifies the financial transaction system to allow buyer 452 to directly transfer information to merchant 456, with complete control of information transfer resident with buyer 452, and assists in banking transactions, if necessary. Alternatively, electronic cash transactions can be done without interacting with a banking system at the time of the purchase, in a form commonly known as "stored value electronic cash transactions".

This invention modifies the current approach of secure electronic transactions, moving away from implicit financial systems and infrastructures to a flexible configuration of financial systems that are assisted through connections between buyer 452 and merchant 456.

Figure 31:
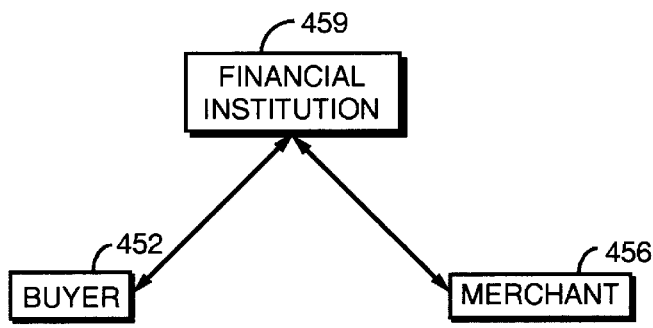
FIG. 31 is a block diagram of exemplary communications between parties involved in a financial transaction.
Figure 32:
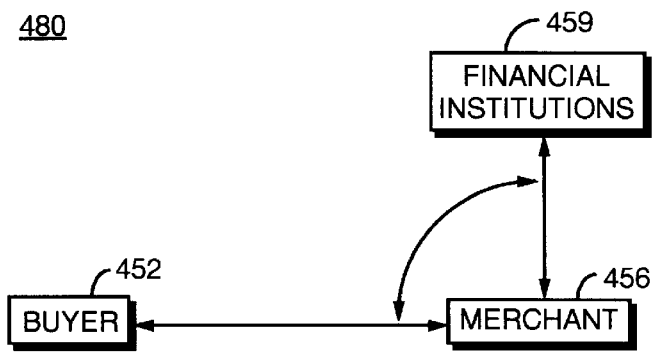
FIG. 32 is another block diagram of exemplary communications between parties involved in a financial transaction.

FIG. 31 shows current approach 480, where buyer 452 and merchant 456 use implicitly defined financial institution 459 as a third party that supervises or guarantees the transaction. FIG. 32 shows new approach 482, where transactions are initiated, controlled and completed through buyer 452, with cooperation from merchant 456 and financial institutions 458, 460. Note that there is an optional assistance from buyer 452 to financial institutions 459 comprising financial institutions 458, 460 (indicated by curved arrows) in cases where buyer 452 is not using a direct electronic cash transfer to merchant 456.

Figure 34:
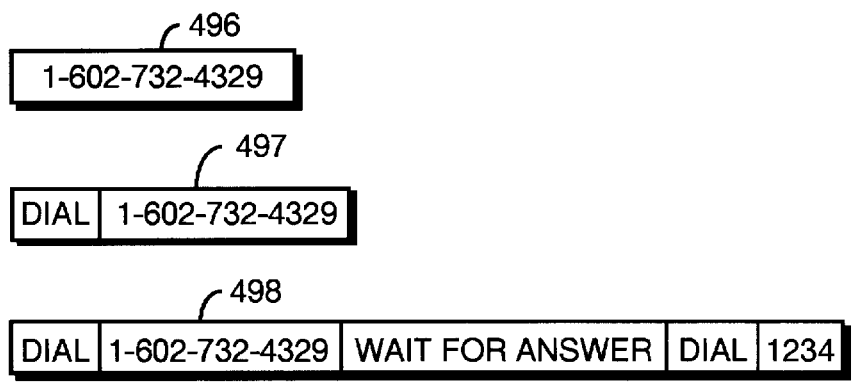
FIG. 34 is an diagram illustrating exemplary message formats involved with implied action barcodes.

FIGS. 33 and 34 show an example of modified or enhanced transaction processing. This invention can be described as two major parts, (i) the devices and their interaction (FIG. 33) and (ii) the barcodes (FIG. 34).

FIG. 33 is an exemplary configuration of barcode reading pen 490 and telephone functions 492 on one side 409/413 of personal transaction and storage device 407 (FIGS. 27 and 28, supra), with each of pen 490 and telephone functions 492 including capabilities such as those shown in FIGS. 2 and 11 and associated text, i.e., including device 21/121. In FIG. 33, barcode reader 490 is drawn in the shape of an ordinary pen, hereinafter referred to simply as "pen 490". Low-power short-range RF link 491 exists between telephone 492 and pen 490. Assume that any information read by pen 490 is immediately broadcast to telephone (or other device) 492. Telephone 492 is capable of interpreting the information received from pen 490 and acts on that information.

FIG. 34 is an diagram illustrating exemplary message formats, with some involving implied action barcodes. The most common form of barcoded information is UPC (universal product code). The UPC identifies the product in question by giving it a unique identification, as illustrated by block 496. However, no verb or action information is normally encoded into a UPC. The system of the instant invention requires that additional information be added to the barcode, specifically an action command, as shown in blocks 497 ("DIAL") and 498 ("DIAL" and "WAIT FOR ANSWER"). The information barcoded in blocks 497–498 now becomes a string of VERB-OBJECT pairs, called an "implied action barcode".

Examples of how implied action barcodes such as 497, 498 may be structured include: a bar code that states (i) "initiate purchase transaction", which may include specific requests for specific information; (ii) "request quotes", which may include implied requests for "quotes with respect to which of our products", "what is your name, credit card number, mailing address" and the like; (iii) "assemble information describing product or service with information identifying requester and method of payment"; or (iv) "add to organizer list", i.e., include this information in your database describing other activities, services or products.

For example, the user might see an advertisement for reduced air fares, which advertisement includes an implied action bar code. The user scans this information into a personal data storage and transaction device 407. The bar code includes information on several different flights, dates available and the like and includes a prompt to display these data to the user and request that one or more selections be made and transmitted along with the other data, and also includes a request for information identifying the user by name, photo etc., information describing a payment method (e.g., credit card number or bank account information). The bar code also includes information sufficient to allow personal data storage and transaction device 407 to contact the travel agency, e.g., telephone or facsimile number, email address and/or the like.

Personal data storage and transaction device 407 displays the flight information and prompts the user to make selections, and also assembles the information describing the travel agent, the user and the method of payment into a message. When personal data storage and transaction device 407 then or later establishes contact with a telephone or other communications medium, a message tailored to use that medium is sent to the travel agency, which message includes information describing the flight or flights chosen, the number of people traveling, their identities and payment information. These data are processed by the travel agency when received and the flight reservations are made and paid for. Confirmation may be made via the financial institution or by the travel agency or both.

Table I is a table of exemplary access levels corresponding to data structuring within personal transaction and storage device 407. This invention is capable of performing several varieties of transactions, with financial transactions being one such transaction type. With this enhanced variety of transaction possibilities, data structuring becomes more complex. There are needs to specify and examine the protection of personal information at various levels. Even though devices and units can "talk to each other", there is always a need or desire that only certain information can be exchanged or modified.

TABLE I

ACCESS LEVELS AND MEANINGS.

| LEVEL | EXEMPLARY ACCESS LEVELS AND MEANINGS |
|---|---|
| 0 | ANONYMOUS |
| 1 | BUSINESS CASUAL |
| 2 | SOCIAL |
| 3 | INTIMATE |
| 4 | SENSITIVE (READ BUT NOT WRITE) |
| 5 | COURIER (CONVEY BUT NOT READ OR WRITE) |

For these reasons, there is at least a six level division of data protection:

(i) at level 0—anonymous, the user will only exchange information that will leave the identity as anonymous;

(ii) at level 1—business casual, the data exchange will be business-related and not very personal, e.g., exchange of business card information;

(iii) at level 2—social, more information (at a "social" level) is exchanged, e.g., social activity calendar;

(iv) at level 3—intimate, information is of a more intimate nature, e.g., sizes of clothes or family event dates;

(v) at level 4—sensitive, data is protected in a "restricted data" fashion where information can be read but not written, so that a person can carry certified information that is authorized by a third party, e.g., financial records that are authenticated and heavily protected; and (vi) at level 5—courier, another group of "restricted data", information is built for items such as medical files or letters of recommendation that are authenticated and heavily protected, and may even be carried by a user while the user cannot ever manipulate the data values or read the information.

Figure 35:
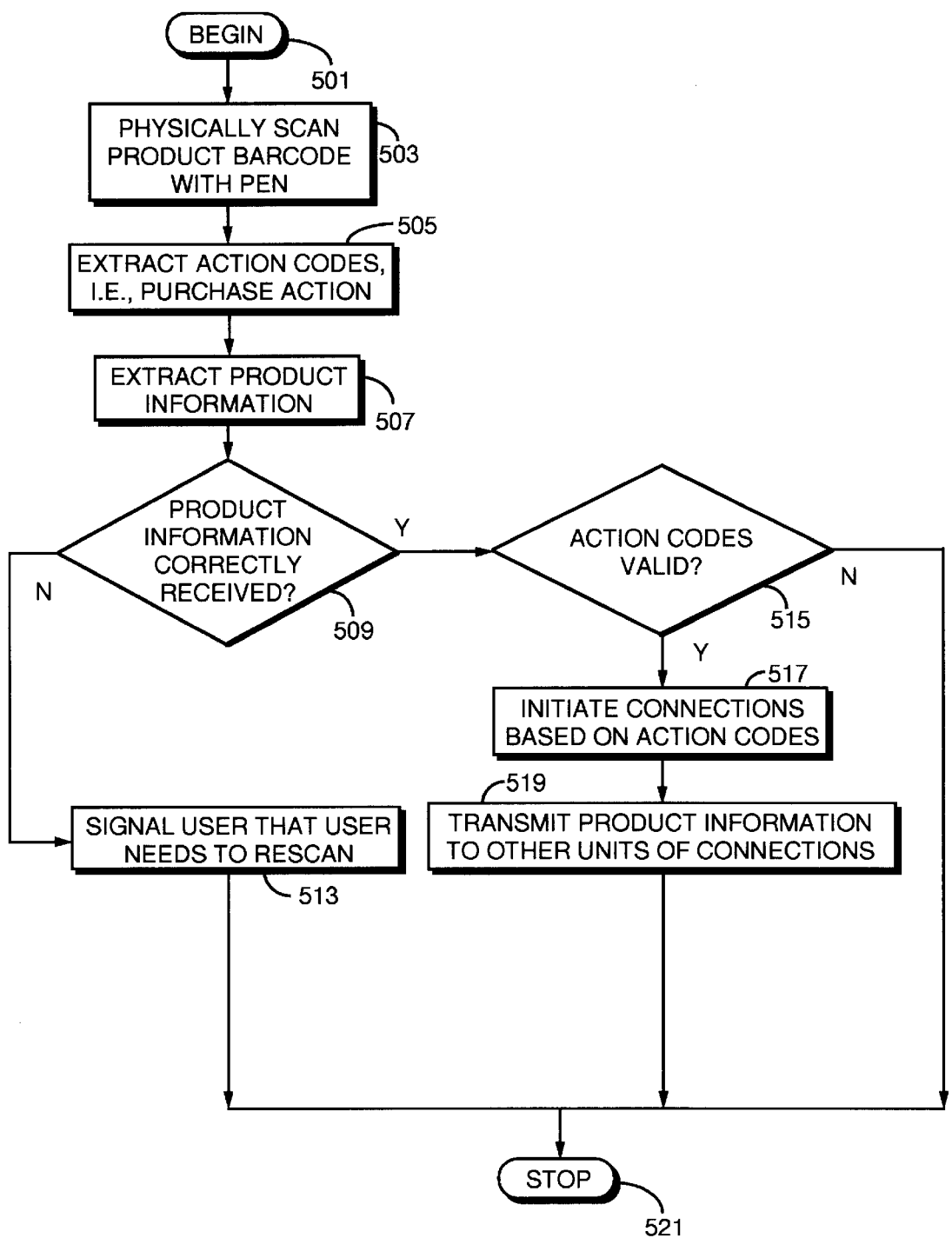
FIG. 35 is a flow chart illustrating a sequence of steps in a process for reading barcode information from a product, using a barcode reading pen and a personal store and transaction device.

FIG. 35 is a flow chart illustrating an exemplary sequence of steps in process 500 for reading barcode information from a product 454 (FIG. 30), using barcode reading pen 490 (FIG. 33) and personal transaction and storage device 407 (FIGS. 26–29). The process begins (block 501) when user 452 (FIG. 30) swipes a barcode (block 503) on product 454 with barcode reading pen 490 (FIG. 33). This barcode is an implied action barcode (see FIG. 34 and associated text), with implied actions to have a purchase made in behalf of buyer 452. Personal transaction and storage device 407 extracts the action codes (block 505) and product information (block 507).

When it is determined (block 509) that the barcode information is not received correctly by personal transaction and storage device 407, a signal is sent (block 513) to the user to warn that another scan should be attempted and the process stops (block 521) until re-initiated by another barcode scan (block 503). When it is determined (block 509) that the barcode information is received correctly, personal transaction and storage device 407 needs to validate the action codes (block 515), checking to make sure that the action codes fall within an understandable vocabulary.

When the action codes are valid, personal transaction and storage device 407 initiates a connection with a merchant device (block 517) and transmits all necessary product and financial information (block 519). Process 500 then ends (block 521). When the action codes are determined (block 515) to not be valid, process 500 also ends (block 521).

Figure 36:
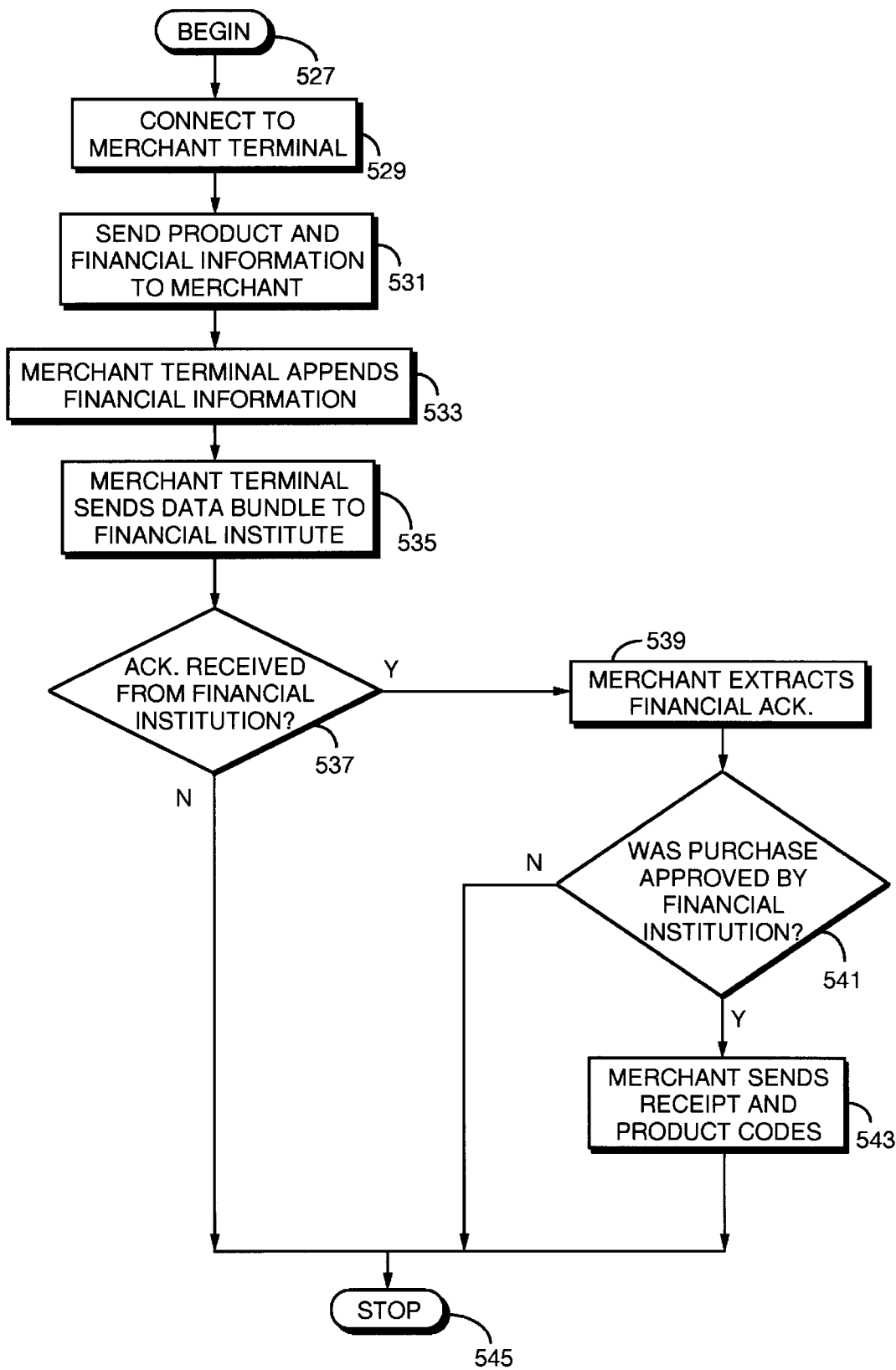
FIG. 36 is a flow chart illustrating a sequence of steps in a process for exchanging financial transaction information between a personal store and transaction device and a merchant device/terminal.

FIG. 36 is a flow chart illustrating a sequence of steps in process 525 for exchanging financial transaction information between personal transaction and storage device 407 (FIGS. 26–29) and merchant 456 (FIG. 30) or a merchant device/terminal. This algorithm demonstrates the modified approach of exchanging financial transactions through a merchant, as shown in FIG. 32.

Process 525 begins (block 527) with personal transaction and storage device 407 connecting to the merchant terminal (block 529), and sends product and financial information (block 531), as mentioned in text associated with FIGS. 31, 35. The merchant terminal appends financial information (block 533), i.e., merchant bank account, merchant billing address, merchant mailing address etc. The bundled information, including the purchasing account information, product codes and merchant account information, is transmitted (block 535) from the merchant terminal to a terminal belonging to a third party financial institution. The merchant terminal waits until it receives an acknowledgment from the financial institution. When it is determined that an acknowledgment is received (block 537), the merchant extracts financial information relevant to the approved purchase (block 539). When it is determined that the purchase is approved by the financial institution (block 541), the merchant sends a receipt and product codes back to the user making the purchase (block 543) and process 525 ends (block 545).

When it is determined that an acknowledgment is not received (block 537), or it is determined that the purchase is not approved by the financial institution (block 541), the financial transaction is stopped and process 525 ends (block 545). Merchant 456 can then decide to pursue alternative financial transactions.

Figure 37:
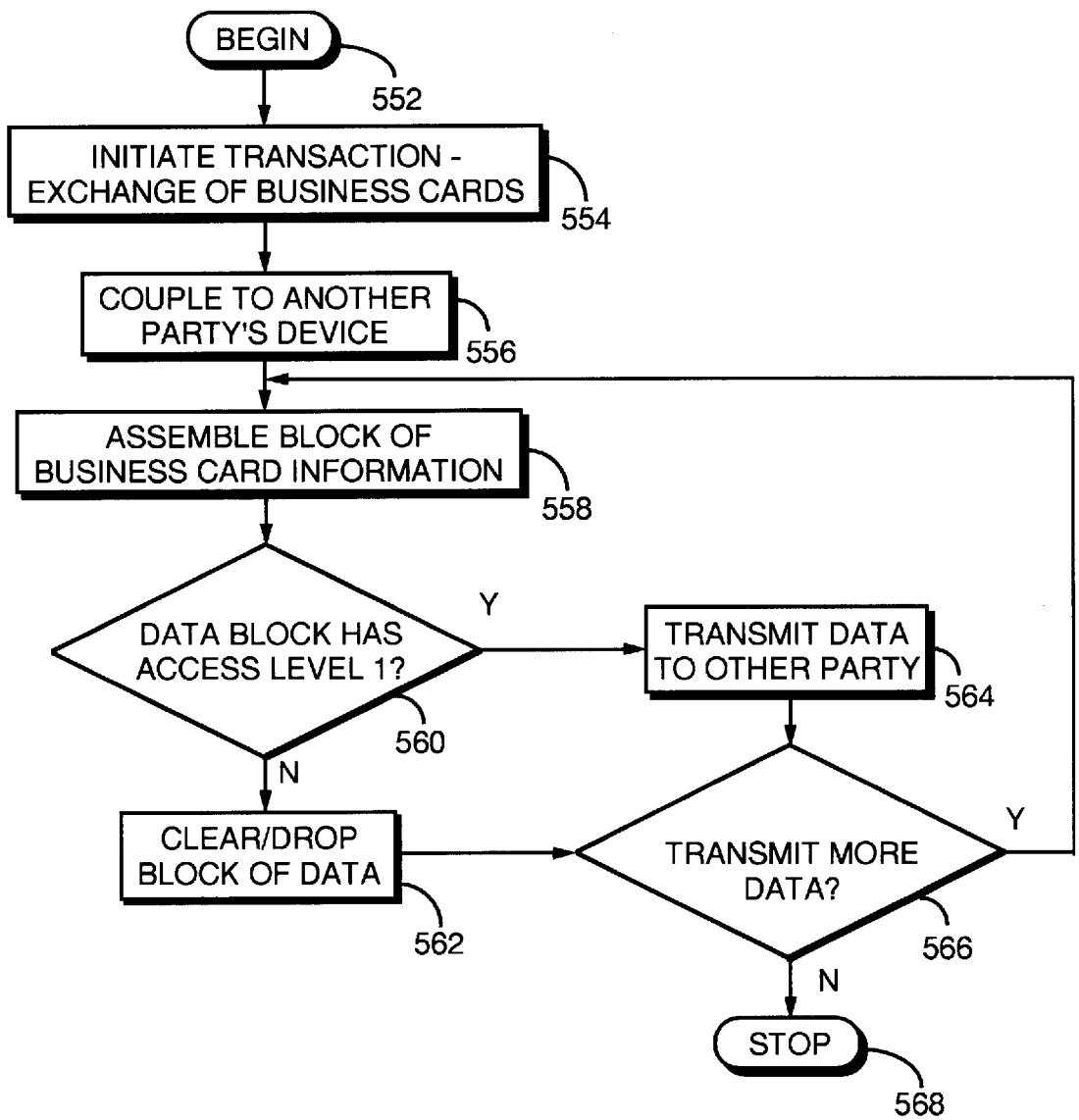
FIG. 37 is a flow chart illustrating a sequence of steps in a process of checking access levels transmitted between a personal store and transaction device and another party's device.

FIG. 37 is a flow chart illustrating a sequence of steps in process 550 of checking access levels transmitted between personal transaction and storage device 407 (FIGS. 26–29) and another party's device. As shown in Table I and associated text (supra), there are various access levels in personal transaction and storage device 407 that help build more complex data structuring. These various access levels are used to control release of information on a corresponding data transaction. For example, while exchanging business cards, a holder of personal transaction and storage device 407 needs to have access levels checked.

Process 550 begins (block 552) with the initiation of a transaction (block 554) and the coupling to another device (block 556). Process 550 includes the assembly of information into transmission blocks (block 558) and the checking of access levels (block 560). Transmission of information to the coupled device follows (block 564) when it is determined that this appropriate, and, when the data access level is not level 1—business casual, the affected data are deleted from the transmission (block 562). When further transmissions are determined to be desired (block 566), control loops back to block 558 and otherwise process 550 terminates (block 568).

Figure 38:
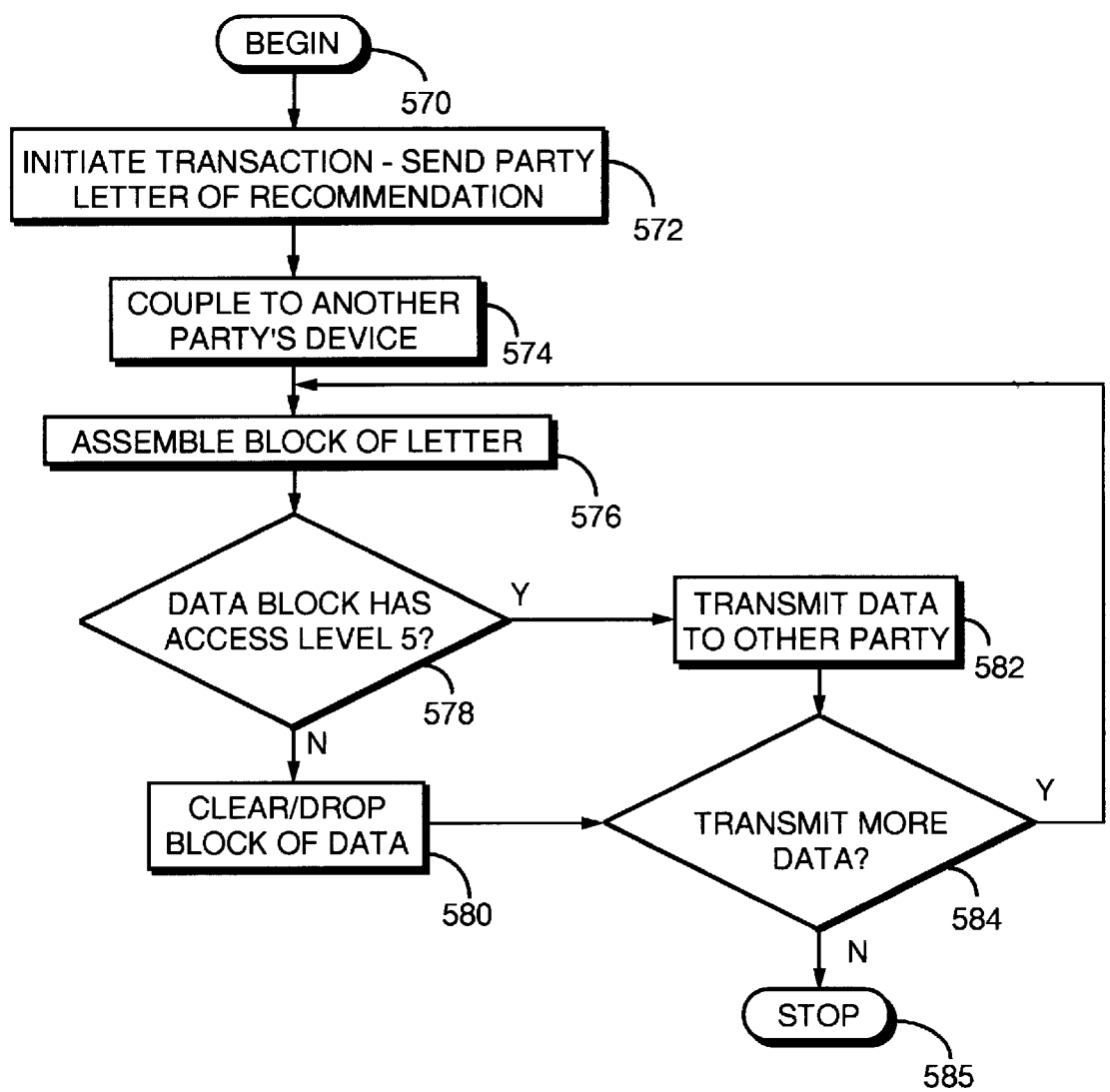
FIG. 38 is yet another flow chart illustrating yet another sequence of steps in a process of checking access levels transmitted between a personal store and transaction device and another party's device.

FIG. 38 is yet another flow chart illustrating yet another exemplary sequence of steps in process 600 of checking access levels transmitted between personal storage and transaction device 407 and another party's device. As a first example, various access levels (see Table I, supra) within personal transaction and storage device 407 are used to control release of information on a corresponding data transaction. As a second example, while exchanging a letter of recommendation, a holder of personal transaction and storage device 407 needs to have access levels checked.

Process 600 begins (block 570) with initiation of a transaction (block 572) and proceeds through steps including connection to another device (block 574), assembly of information into transmission blocks (block 576), checking of access levels (block 578) and transmission of information to the connected device (block 582) when data access levels are appropriate. When the data access level is not level 5—courier, the transmission is skipped (block 580). When it is determined that further data transmission is in order (block 584), process 600 skips back to block 576 and assembles another block of data, with steps outlined in blocks 578 through 584 following. When it is determined that further data transmission is not desired, process 600 ends (block 585).

Personal data storage and transaction device 407 is a versatile tool enabling many network interactions, particularly interacting with other elements in a capability addressable network. Examples I–V supra feature embodiments of other devices in a capability addressable network, and, therefore, can be described as interacting with personal data storage and transaction device 407.

Personal data storage and transaction device 407 can maintain the personalized data for telephone or data access services described in Example I. This allows personalized records describing either an individual user's preferences, location and/or statistics (IUPLS 134) or a roaming user's preferences, location, local telephone number and/or statistics (RUPLS 134) to be maintained and stored in convenient fashion.

As in Example II, personal store and transaction device 407 carried by a user who is approaching, for example, rental car 191, allows transmission of personalized information to the car. Or, as shown in Example III, personal information maintained in the personal store and transaction device relative to entertainment media, e.g., television program viewing preferences, can be transmitted to a nearby television set or system.

Example IV describes a more complex situation. Personal data storage and transaction device 407 can be either a client or service device within a security system described therein. For example, as a client of the security system of Example IV, personal data storage and transaction device 407 can be monitored and protected from theft or misplacement or misuse following theft or misplacement. As a server in the security system of Example IV, personal data storage and transaction device 407 can be used to configure security information into other devices of the security family.

Example V shows an interactive remote controller application, which is a functional domain that can be implemented within personal data storage and transaction device 407. Personal data storage and transaction device 407 contains multiple functional domains, where a personal organizer and telephone were shown in Example VI, but the remote controller function could be added or substituted in personal data storage and transaction device 407.

In summary, the present invention provides an improved personal data storage and transaction device capable of forming a network with, and interacting with via the network, other data storage and transaction devices, and a corresponding method. This network is suitable for interconnecting a plurality of everyday electronic devices, including movable and portable devices that provide a vast and diverse assortment of services. A priori activation and setup procedures are not required in this network because no network specific equipment requires network addresses in order to make connections.

Although device addresses are not needed to establish connections, device names must be known by connected peers before meaningful communication can be established and information exchanged. In this context, a device or peer name is simply a unique identifier that allows one device or peer 20 to be uniquely distinguished from any other device or peer 20. Consequently, a minimal amount of user involvement is needed to make connections to peers and peers may make connections to new peers as a routine matter.

Connections between such devices allow electronic transactions to be carried out without requiring exchanges of physical money, charge cards and the like. Information like that contained on business cards may be exchanged or not, according to user preferences.

Network node addressing is dynamically configurable because network connections are formed based upon proximity and upon a needs and capabilities evaluation rather than on unique network-wide address encoding.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method for personalizing an electronic device through a personal area network, comprising the steps of:

transmitting a self-initiated message by the electronic device that includes an identification code of the electronic device;

receiving a self-initiated message from another electronic device and a response message in response to the identification code of the electronic device in the self-initiated message;

configuring the application of the electronic device based on the response message; and displaying data received by the electronic device based on the application.

2. The method of claim 1, wherein the step of receiving the response message further includes the step of receiving control data that sets the application of the electronic device.

3. The method of claim 2, further including the step of receiving the data formatted for the application as set by the response message.

4. The method of claim 1, further including the step of displaying the data.

5. The method of claim 4, wherein the step of displaying the data further includes the step of displaying the data when the response message includes the identification code of the electronic device.

6. The method of claim 4, wherein the step of displaying the data further includes the step of displaying financial data received from a barcode reader.

7. The method of claim 1, wherein the step of transmitting the self-initiated message further includes the step of using a wireless connection for transmitting within the personal area network.

8. The method of claim 5, wherein the step of transmitting the self-initiated message further includes the stop of using radio frequencies (RF).

9. A method for personalizing an electronic device, comprising the steps of:

receiving an unsolicited message that includes an identification code of another electronic device;

transmitting an unsolicited message by the electronic device that includes an identification code of the electronic device;

receiving a response message from the another electronic device in response to the identification code of the electronic device; and configuring the electronic device for an application based on the response message.

10. The method of claim 9, wherein the step of configuring the electronic device further includes the steps of:

configuring the electronic device to receive data for the application based on control data received in the response message; and configuring a display of the electronic device to display the data based on the application.

11. The method of claim 9, further comprising the step of transmitting the unsolicited message periodically.

12. The method of claim 9, further comprising the step of transmitting information describing a capability of the electronic device for performing a function on the data.

13. The method of claim 9, further comprising the step of transmitting identifying information stored in the electronic device.

14. A method for personalizing an electronic device, comprising the steps of:

receiving an unsolicited message that includes an identification code of another electronic device;

transmitting an unsolicited message by the electronic device that includes an identification code of the electronic device;

receiving a response message from the another electronic device in response to the identification code of the electronic device;

configuring the electronic device for an application based on the response message;

transmitting an interrogation signal periodically from the electronic device; and sending a security alarm sequence when a signal is not received in response to the interrogation signal.

15. The method of claim 14, further comprising the steps of:

transmitting a request message to a telephone;

receiving a reply message from the telephone that establishes communication with the electronic device; and sending a security message from the electronic device to the telephone that includes an identification of the electronic device.

16. The method of claim 14, further comprising the step of inhibiting the electronic device from further communications while the electronic device is sending the security alarm sequence.

17. An electronic device, comprising:

an antenna;

a transmitter having an output coupled to the antenna for transmitting an unsolicited message that includes an identification code of the electronic device;

a receiver having an input coupled to the antenna for receiving an unsolicited message that includes an identification code of another electronic device and a response message based on the identification code of the electronic device; and a display having terminals coupled to an output of the receiver for receiving signals that configure the display for an application based on the response message.

18. The electronic device of claim 17, further comprising a processor having an input coupled to the receiver and an output coupled to the display for configuring the electronic device to receive data for the application based on control data that is received in the response message.

* * * * *

UNITED STATES PATENT AND TRADEMARK OFFICE
CERTIFICATE OF CORRECTION

PATENT NO. : 6,331,972 B1  
DATED : December 18, 2001  
INVENTOR(S) : Harris et al.

It is certified that error appears in the above-identified patent and that said Letters Patent is hereby corrected as shown below:

<u>Column 29,</u>  
Line 21, change "stop" to -- step --

Signed and Sealed this

Twenty-eighth Day of May, 2002

Attest:

JAMES E. ROGAN  
*Attesting Officer*  *Director of the United States Patent and Trademark Office*